United States Patent
Jain et al.

(10) Patent No.: US 11,805,056 B2
(45) Date of Patent: *Oct. 31, 2023

(54) METHOD AND SYSTEM FOR SERVICE SWITCHING USING SERVICE TAGS

(71) Applicant: Nicira, Inc., Palo Alto, CA (US)

(72) Inventors: Jayant Jain, Cupertino, CA (US);
Anirban Sengupta, Saratoga, CA (US)

(73) Assignee: NICIRA, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/902,879

(22) Filed: Sep. 4, 2022

(65) Prior Publication Data
US 2022/0417150 A1 Dec. 29, 2022

Related U.S. Application Data

(63) Continuation of application No. 16/905,909, filed on Jun. 18, 2020, now Pat. No. 11,438,267, which is a
(Continued)

(51) Int. Cl.
*H04L 12/741* (2013.01)
*H04L 45/74* (2022.01)
(Continued)

(52) U.S. Cl.
CPC .......... *H04L 45/74* (2013.01); *H04L 12/4633* (2013.01); *H04L 45/306* (2013.01);
(Continued)

(58) Field of Classification Search
CPC . H04L 45/74; H04L 2212/00; H04L 12/4641; H04L 12/4633; H04L 49/20;
(Continued)

(56) References Cited

U.S. PATENT DOCUMENTS 6,006,264 A 12/1999 Colby et al.
6,104,700 A 8/2000 Haddock et al.
(Continued)

FOREIGN PATENT DOCUMENTS

CA 2358607 A1 4/2002
CA 3034809 A1 3/2018
(Continued)

OTHER PUBLICATIONS

Author Unknown, "Research on Multi-tenancy Network Technology for Datacenter Network," May 2015, 64 pages, Beijing Jiaotong University.
(Continued)

*Primary Examiner* — Man U Phan
(74) *Attorney, Agent, or Firm* — ADELI LLP

(57) ABSTRACT

The disclosure herein describes a system, which provides service switching in a datacenter environment. The system can include a service switching gateway, which can identify a service tag associated with a received packet. During operation, the service switching gateway determines a source client, a requested service, or both for the packet based on the service tag, identifies a corresponding service portal based on the service tag, and forwards the packet toward the service portal. The service switching gateway can optionally maintain a mapping between the service tag and one or more of: a source client, a required service, the service portal, and a tunnel encapsulation. The service switching gateway can encapsulate the packet based on an encapsulation mechanism supported by the service portal and forward the packet based on the mapping.

14 Claims, 9 Drawing Sheets

Related U.S. Application Data continuation of application No. 15/973,487, filed on May 7, 2018, now Pat. No. 10,693,782, which is a continuation of application No. 14/960,441, filed on Dec. 7, 2015, now Pat. No. 9,979,641, which is a continuation of application No. 13/891,025, filed on May 9, 2013, now Pat. No. 9,225,638.

(51) Int. Cl.
　　*H04L 67/10*　　　(2022.01)
　　*H04L 45/302*　　 (2022.01)
　　*H04L 12/46*　　　(2006.01)
　　*H04L 49/20*　　　(2022.01)

(52) U.S. Cl.
　　CPC .............. *H04L 49/20* (2013.01); *H04L 67/10* (2013.01); *H04L 12/4641* (2013.01); *H04L 2212/00* (2013.01)

(58) Field of Classification Search
　　CPC ..... H04L 45/306; H04L 67/10; H04L 12/741; H04L 29/08; H04L 12/725; H04L 12/46; H04L 12/931
　　USPC .......................................................... 370/389
　　See application file for complete search history.

(56) References Cited

U.S. PATENT DOCUMENTS

| | | |
|---|---|---|
| 6,154,448 A | 11/2000 | Petersen et al. |
| 6,772,211 B2 | 8/2004 | Lu et al. |
| 6,779,030 B1 | 8/2004 | Dugan et al. |
| 6,826,694 B1 | 11/2004 | Dutta et al. |
| 6,880,089 B1 | 4/2005 | Bommareddy et al. |
| 6,985,956 B2 | 1/2006 | Luke et al. |
| 7,013,389 B1 | 3/2006 | Srivastava et al. |
| 7,209,977 B2 | 4/2007 | Acharya et al. |
| 7,239,639 B2 | 7/2007 | Cox et al. |
| 7,379,465 B2 | 5/2008 | Aysan et al. |
| 7,406,540 B2 | 7/2008 | Acharya et al. |
| 7,447,775 B1 | 11/2008 | Zhu et al. |
| 7,480,737 B2 | 1/2009 | Chauffour et al. |
| 7,487,250 B2 | 2/2009 | Siegel |
| 7,499,463 B1 | 3/2009 | Droux et al. |
| 7,649,890 B2 | 1/2010 | Mizutani et al. |
| 7,698,458 B1 | 4/2010 | Liu et al. |
| 7,818,452 B2 | 10/2010 | Matthews et al. |
| 7,898,959 B1 | 3/2011 | Arad |
| 7,921,174 B1 | 4/2011 | Denise |
| 7,948,986 B1 | 5/2011 | Ghosh et al. |
| 8,078,903 B1 | 12/2011 | Parthasarathy et al. |
| 8,094,575 B1 | 1/2012 | Vadlakonda et al. |
| 8,175,863 B1 | 5/2012 | Ostermeyer et al. |
| 8,190,767 B1 | 5/2012 | Maufer et al. |
| 8,201,219 B2 | 6/2012 | Jones |
| 8,223,634 B2 | 7/2012 | Tanaka et al. |
| 8,224,885 B1 | 7/2012 | Doucette et al. |
| 8,230,493 B2 | 7/2012 | Davidson et al. |
| 8,266,261 B2 | 9/2012 | Akagi |
| 8,339,959 B1 | 12/2012 | Moisand et al. |
| 8,451,735 B2 | 5/2013 | Li |
| 8,484,348 B2 | 7/2013 | Subramanian et al. |
| 8,488,577 B1 | 7/2013 | Macpherson |
| 8,521,879 B1 | 8/2013 | Pena et al. |
| 8,615,009 B1 * | 12/2013 | Ramamoorthi .......... H04L 69/22 370/389 |
| 8,707,383 B2 | 4/2014 | Bade et al. |
| 8,738,702 B1 | 5/2014 | Belanger et al. |
| 8,743,885 B2 | 6/2014 | Khan et al. |
| 8,804,720 B1 | 8/2014 | Rainovic et al. |
| 8,804,746 B2 | 8/2014 | Wu et al. |
| 8,811,412 B2 | 8/2014 | Shippy |
| 8,830,834 B2 * | 9/2014 | Sharma ................... H04L 45/66 370/235 |
| 8,832,683 B2 | 9/2014 | Heim |
| 8,849,746 B2 | 9/2014 | Candea et al. |
| 8,856,518 B2 | 10/2014 | Sridharan et al. |
| 8,862,883 B2 * | 10/2014 | Cherukuri ........... H04L 41/0803 713/171 |
| 8,868,711 B2 | 10/2014 | Skjolsvold et al. |
| 8,873,399 B2 | 10/2014 | Bothos et al. |
| 8,874,789 B1 | 10/2014 | Zhu |
| 8,892,706 B1 | 11/2014 | Dalal |
| 8,913,611 B2 | 12/2014 | Koponen et al. |
| 8,914,406 B1 | 12/2014 | Haugsnes et al. |
| 8,966,024 B2 | 2/2015 | Koponen et al. |
| 8,966,029 B2 | 2/2015 | Zhang et al. |
| 8,971,345 B1 * | 3/2015 | McCanne ........... H04L 47/2441 370/412 |
| 8,989,192 B2 * | 3/2015 | Foo ..................... H04L 12/4633 370/392 |
| 8,996,610 B1 | 3/2015 | Sureshchandra et al. |
| 9,009,289 B1 | 4/2015 | Jacob |
| 9,015,823 B2 | 4/2015 | Koponen et al. |
| 9,094,464 B1 | 7/2015 | Scharber et al. |
| 9,104,497 B2 | 8/2015 | Mortazavi |
| 9,148,367 B2 | 9/2015 | Kandaswamy et al. |
| 9,172,603 B2 | 10/2015 | Padmanabhan et al. |
| 9,178,709 B2 | 11/2015 | Higashida et al. |
| 9,191,293 B2 | 11/2015 | Iovene et al. |
| 9,195,491 B2 | 11/2015 | Zhang et al. |
| 9,203,748 B2 | 12/2015 | Jiang et al. |
| 9,225,638 B2 | 12/2015 | Jain et al. |
| 9,225,659 B2 * | 12/2015 | McCanne ........... H04L 47/6215 |
| 9,232,342 B2 | 1/2016 | Seed et al. |
| 9,237,098 B2 | 1/2016 | Patel et al. |
| 9,256,467 B1 | 2/2016 | Singh et al. |
| 9,258,742 B1 | 2/2016 | Pianigiani et al. |
| 9,264,313 B1 | 2/2016 | Manuguri et al. |
| 9,277,412 B2 | 3/2016 | Freda et al. |
| 9,344,337 B2 | 5/2016 | Kumar et al. |
| 9,363,183 B2 | 6/2016 | Kumar et al. |
| 9,397,946 B1 | 7/2016 | Yadav |
| 9,407,540 B2 | 8/2016 | Kumar et al. |
| 9,407,599 B2 | 8/2016 | Koponen et al. |
| 9,419,897 B2 | 8/2016 | Cherian et al. |
| 9,442,752 B1 | 9/2016 | Roth et al. |
| 9,467,382 B2 | 10/2016 | Kumar et al. |
| 9,479,358 B2 | 10/2016 | Klosowski et al. |
| 9,503,530 B1 | 11/2016 | Niedzielski |
| 9,531,590 B2 | 12/2016 | Jain et al. |
| 9,577,845 B2 | 2/2017 | Thakkar et al. |
| 9,602,380 B2 | 3/2017 | Strassner |
| 9,608,896 B2 | 3/2017 | Kumar et al. |
| 9,660,905 B2 | 5/2017 | Dunbar et al. |
| 9,686,192 B2 | 6/2017 | Sengupta et al. |
| 9,686,200 B2 | 6/2017 | Pettit et al. |
| 9,705,702 B2 | 7/2017 | Foo et al. |
| 9,705,775 B2 | 7/2017 | Zhang et al. |
| 9,749,229 B2 | 8/2017 | Previdi et al. |
| 9,755,898 B2 | 9/2017 | Jain et al. |
| 9,755,971 B2 | 9/2017 | Wang et al. |
| 9,774,537 B2 | 9/2017 | Jain et al. |
| 9,787,559 B1 | 10/2017 | Schroeder |
| 9,787,605 B2 | 10/2017 | Zhang et al. |
| 9,804,797 B1 | 10/2017 | Ng et al. |
| 9,825,810 B2 | 11/2017 | Jain et al. |
| 9,860,079 B2 | 1/2018 | Cohn et al. |
| 9,900,410 B2 | 2/2018 | Dalal |
| 9,935,827 B2 | 4/2018 | Jain et al. |
| 9,979,641 B2 | 5/2018 | Jain et al. |
| 9,985,896 B2 | 5/2018 | Koponen et al. |
| 9,996,380 B2 | 6/2018 | Singh et al. |
| 10,013,276 B2 | 7/2018 | Fahs et al. |
| 10,042,722 B1 | 8/2018 | Chigurupati et al. |
| 10,075,470 B2 | 9/2018 | Vaidya et al. |
| 10,079,779 B2 | 9/2018 | Zhang et al. |
| 10,084,703 B2 | 9/2018 | Kumar et al. |
| 10,089,127 B2 | 10/2018 | Padmanabhan et al. |
| 10,091,276 B2 | 10/2018 | Bloomquist et al. |
| 10,104,169 B1 | 10/2018 | Moniz et al. |
| 10,129,077 B2 | 11/2018 | Jain et al. |
| 10,129,180 B2 | 11/2018 | Zhang et al. |

(56) References Cited

U.S. PATENT DOCUMENTS

| | | |
|---|---|---|
| 10,135,636 B2 | 11/2018 | Jiang et al. |
| 10,135,737 B2 | 11/2018 | Jain et al. |
| 10,158,573 B1 | 12/2018 | Lee et al. |
| 10,187,306 B2 | 1/2019 | Nainar et al. |
| 10,200,493 B2 | 2/2019 | Bendapudi et al. |
| 10,212,071 B2 | 2/2019 | Kancherla et al. |
| 10,225,137 B2 | 3/2019 | Jain et al. |
| 10,237,379 B2 | 3/2019 | Kumar et al. |
| 10,250,501 B2 | 4/2019 | Ni |
| 10,257,095 B2 | 4/2019 | Jain et al. |
| 10,284,390 B2 | 5/2019 | Kumar et al. |
| 10,305,822 B2 | 5/2019 | Tao et al. |
| 10,320,679 B2 | 6/2019 | Jain et al. |
| 10,333,822 B1 | 6/2019 | Jeuk et al. |
| 10,341,233 B2 | 7/2019 | Jain et al. |
| 10,341,427 B2 | 7/2019 | Jalan et al. |
| 10,375,155 B1 | 8/2019 | Cai et al. |
| 10,390,285 B2 | 8/2019 | Zhou |
| 10,397,275 B2 | 8/2019 | Jain et al. |
| 10,445,509 B2 | 10/2019 | Thota et al. |
| 10,484,334 B1 | 11/2019 | Lee et al. |
| 10,514,941 B2 | 12/2019 | Zhang et al. |
| 10,516,568 B2 | 12/2019 | Jain et al. |
| 10,547,508 B1 | 1/2020 | Kanakarajan |
| 10,547,692 B2 | 1/2020 | Salgueiro et al. |
| 10,554,484 B2 | 2/2020 | Chanda et al. |
| 10,594,743 B2 | 3/2020 | Hong et al. |
| 10,609,091 B2 | 3/2020 | Hong et al. |
| 10,609,122 B1 | 3/2020 | Argenti et al. |
| 10,623,309 B1 | 4/2020 | Gampel et al. |
| 10,637,750 B1 | 4/2020 | Bollineni et al. |
| 10,645,060 B2 | 5/2020 | Ao et al. |
| 10,645,201 B2 | 5/2020 | Mishra et al. |
| 10,659,252 B2 | 5/2020 | Boutros et al. |
| 10,693,782 B2 | 6/2020 | Jain et al. |
| 10,700,891 B2 | 6/2020 | Hao et al. |
| 10,708,229 B2 | 7/2020 | Sevinc et al. |
| 10,728,174 B2 | 7/2020 | Boutros et al. |
| 10,735,311 B2 | 8/2020 | Li |
| 10,742,544 B2 | 8/2020 | Roeland et al. |
| 10,757,077 B2 | 8/2020 | Rajahalme et al. |
| 10,797,910 B2 | 10/2020 | Boutros et al. |
| 10,797,966 B2 | 10/2020 | Boutros et al. |
| 10,802,858 B2 | 10/2020 | Gunda |
| 10,805,181 B2 | 10/2020 | Boutros et al. |
| 10,805,192 B2 | 10/2020 | Boutros et al. |
| 10,812,378 B2 | 10/2020 | Nainar et al. |
| 10,826,835 B2 | 11/2020 | Ruckstuhl et al. |
| 10,834,004 B2 | 11/2020 | Yigit et al. |
| 10,853,111 B1 | 12/2020 | Gupta et al. |
| 10,929,171 B2 | 2/2021 | Gokhale et al. |
| 10,931,793 B2 | 2/2021 | Kumar et al. |
| 10,938,668 B1 | 3/2021 | Zulak et al. |
| 10,938,716 B1 | 3/2021 | Chin et al. |
| 10,944,673 B2 | 3/2021 | Naveen et al. |
| 10,949,244 B2 | 3/2021 | Naveen et al. |
| 10,997,177 B1 | 5/2021 | Howes et al. |
| 11,003,482 B2 | 5/2021 | Rolando et al. |
| 11,012,351 B2 | 5/2021 | Feng et al. |
| 11,012,420 B2 | 5/2021 | Sevinc et al. |
| 11,026,047 B2 | 6/2021 | Greenberger et al. |
| 11,036,538 B2 | 6/2021 | Lecuyer et al. |
| 11,038,782 B2 | 6/2021 | Boutros et al. |
| 11,042,397 B2 | 6/2021 | Mishra et al. |
| 11,055,273 B1 | 7/2021 | Meduri et al. |
| 11,074,097 B2 | 7/2021 | Naveen et al. |
| 11,075,839 B2 | 7/2021 | Zhuang et al. |
| 11,075,842 B2 | 7/2021 | Jain et al. |
| 11,086,654 B2 | 8/2021 | Rolando et al. |
| 11,119,804 B2 | 9/2021 | Gokhale et al. |
| 11,140,218 B2 | 10/2021 | Tidemann et al. |
| 11,153,190 B1 | 10/2021 | Mahajan et al. |
| 11,153,406 B2 | 10/2021 | Sawant et al. |
| 11,157,304 B2 | 10/2021 | Watt, Jr. et al. |
| 11,184,397 B2 | 11/2021 | Annadata et al. |
| 11,194,610 B2 | 12/2021 | Mundaragi et al. |
| 11,212,356 B2 | 12/2021 | Rolando et al. |
| 11,223,494 B2 | 1/2022 | Mishra et al. |
| 11,249,784 B2 | 2/2022 | Chalvadi et al. |
| 11,265,187 B2 | 3/2022 | Boutros et al. |
| 11,277,331 B2 | 3/2022 | Rolando et al. |
| 11,283,717 B2 | 3/2022 | Tidemann et al. |
| 11,288,088 B2 | 3/2022 | Rolando et al. |
| 11,294,703 B2 | 4/2022 | Rolando et al. |
| 11,296,930 B2 | 4/2022 | Jain et al. |
| 11,301,281 B2 | 4/2022 | Rolando et al. |
| 11,316,900 B1 | 4/2022 | Schottland et al. |
| 11,321,113 B2 | 5/2022 | Feng et al. |
| 11,354,148 B2 | 6/2022 | Rolando et al. |
| 11,360,796 B2 | 6/2022 | Mishra et al. |
| 11,368,387 B2 | 6/2022 | Rolando et al. |
| 11,397,604 B2 | 7/2022 | Mundaragi et al. |
| 11,398,983 B2 | 7/2022 | Wijnands et al. |
| 11,405,431 B2 | 8/2022 | Hong et al. |
| 11,411,863 B2 | 8/2022 | Zhang et al. |
| 11,438,257 B2 | 9/2022 | Rolando et al. |
| 11,438,267 B2 | 9/2022 | Jain et al. |
| 11,467,861 B2 | 10/2022 | Kavathia et al. |
| 11,496,606 B2 | 11/2022 | Jain et al. |
| 11,528,213 B2 | 12/2022 | Venkatasubbaiah et al. |
| 11,528,219 B2 | 12/2022 | Rolando et al. |
| 11,595,250 B2 | 2/2023 | Naveen et al. |
| 11,604,666 B2 | 3/2023 | Feng et al. |
| 11,609,781 B2 | 3/2023 | Mishra et al. |
| 11,611,625 B2 | 3/2023 | Jain et al. |
| 11,659,061 B2 | 5/2023 | Sawant et al. |
| 2002/0010783 A1 | 1/2002 | Primak et al. |
| 2002/0078370 A1 | 6/2002 | Tahan |
| 2002/0097724 A1 | 7/2002 | Halme et al. |
| 2002/0194350 A1 | 12/2002 | Lu et al. |
| 2003/0065711 A1 | 4/2003 | Acharya et al. |
| 2003/0093481 A1 | 5/2003 | Mitchell et al. |
| 2003/0097429 A1 | 5/2003 | Wu et al. |
| 2003/0105812 A1 | 6/2003 | Flowers et al. |
| 2003/0188026 A1 | 10/2003 | Denton et al. |
| 2003/0236813 A1 | 12/2003 | Abjanic |
| 2004/0066769 A1 | 4/2004 | Ahmavaara et al. |
| 2004/0210670 A1 | 10/2004 | Anerousis et al. |
| 2004/0215703 A1 | 10/2004 | Song et al. |
| 2004/0249776 A1 | 12/2004 | Horvitz et al. |
| 2005/0021713 A1 | 1/2005 | Dugan et al. |
| 2005/0089327 A1 | 4/2005 | Ovadia et al. |
| 2005/0091396 A1 | 4/2005 | Nilakantan et al. |
| 2005/0114429 A1 | 5/2005 | Caccavale |
| 2005/0114648 A1 | 5/2005 | Akundi et al. |
| 2005/0132030 A1 | 6/2005 | Hopen et al. |
| 2005/0198200 A1 | 9/2005 | Subramanian et al. |
| 2005/0249199 A1 | 11/2005 | Albert et al. |
| 2006/0069776 A1 | 3/2006 | Shim et al. |
| 2006/0112297 A1 | 5/2006 | Davidson |
| 2006/0130133 A1 | 6/2006 | Andreev et al. |
| 2006/0155862 A1 | 7/2006 | Kathi et al. |
| 2006/0195896 A1 | 8/2006 | Fulp et al. |
| 2006/0233155 A1 | 10/2006 | Srivastava |
| 2007/0061492 A1 | 3/2007 | Riel |
| 2007/0121615 A1 | 5/2007 | Weill et al. |
| 2007/0153782 A1 | 7/2007 | Fletcher et al. |
| 2007/0214282 A1 | 9/2007 | Sen |
| 2007/0248091 A1 | 10/2007 | Khalid et al. |
| 2007/0260750 A1 | 11/2007 | Feied et al. |
| 2007/0288615 A1 | 12/2007 | Keohane et al. |
| 2007/0291773 A1 | 12/2007 | Khan et al. |
| 2008/0005293 A1 | 1/2008 | Bhargava et al. |
| 2008/0031263 A1 | 2/2008 | Ervin et al. |
| 2008/0046400 A1 | 2/2008 | Shi et al. |
| 2008/0049614 A1 | 2/2008 | Briscoe et al. |
| 2008/0049619 A1 | 2/2008 | Twiss |
| 2008/0049786 A1 | 2/2008 | Ram et al. |
| 2008/0072305 A1 | 3/2008 | Casado et al. |
| 2008/0084819 A1 | 4/2008 | Parizhsky et al. |
| 2008/0095153 A1 | 4/2008 | Fukunaga et al. |
| 2008/0104608 A1 | 5/2008 | Hyser et al. |
| 2008/0195755 A1 | 8/2008 | Lu et al. |
| 2008/0225714 A1 | 9/2008 | Denis |

(56) References Cited

U.S. PATENT DOCUMENTS

| | | |
|---|---|---|
| 2008/0239991 A1 | 10/2008 | Applegate et al. |
| 2008/0247396 A1 | 10/2008 | Hazard |
| 2008/0276085 A1 | 11/2008 | Davidson et al. |
| 2008/0279196 A1 | 11/2008 | Friskney et al. |
| 2009/0003349 A1 | 1/2009 | Havemann et al. |
| 2009/0003364 A1 | 1/2009 | Fendick et al. |
| 2009/0003375 A1 | 1/2009 | Havemann et al. |
| 2009/0019135 A1 | 1/2009 | Eswaran et al. |
| 2009/0037713 A1 | 2/2009 | Khalid et al. |
| 2009/0063706 A1 | 3/2009 | Goldman et al. |
| 2009/0129271 A1 | 5/2009 | Ramankutty et al. |
| 2009/0172666 A1 | 7/2009 | Yahalom et al. |
| 2009/0190506 A1 | 7/2009 | Belling et al. |
| 2009/0199268 A1 | 8/2009 | Ahmavaara et al. |
| 2009/0235325 A1 | 9/2009 | Dimitrakos et al. |
| 2009/0238084 A1 | 9/2009 | Nadeau et al. |
| 2009/0249472 A1 | 10/2009 | Litvin et al. |
| 2009/0265467 A1 | 10/2009 | Peles et al. |
| 2009/0271586 A1 | 10/2009 | Shaath |
| 2009/0299791 A1 | 12/2009 | Blake et al. |
| 2009/0300210 A1 | 12/2009 | Ferris |
| 2009/0303880 A1 | 12/2009 | Maltz et al. |
| 2009/0307334 A1 | 12/2009 | Maltz et al. |
| 2009/0327464 A1 | 12/2009 | Archer et al. |
| 2010/0031360 A1 | 2/2010 | Seshadri et al. |
| 2010/0036903 A1 | 2/2010 | Ahmad et al. |
| 2010/0100616 A1* | 4/2010 | Bryson ............... H04L 63/0272 370/392 |
| 2010/0131638 A1 | 5/2010 | Kondamuru |
| 2010/0165985 A1 | 7/2010 | Sharma et al. |
| 2010/0223364 A1 | 9/2010 | Wei |
| 2010/0223621 A1 | 9/2010 | Joshi et al. |
| 2010/0235915 A1 | 9/2010 | Memon et al. |
| 2010/0254385 A1 | 10/2010 | Sharma et al. |
| 2010/0257278 A1 | 10/2010 | Gunturu |
| 2010/0265824 A1 | 10/2010 | Chao et al. |
| 2010/0281482 A1 | 11/2010 | Pike et al. |
| 2010/0332595 A1 | 12/2010 | Fullagar et al. |
| 2011/0010578 A1 | 1/2011 | Dominguez et al. |
| 2011/0016348 A1 | 1/2011 | Pace et al. |
| 2011/0022695 A1 | 1/2011 | Dalal et al. |
| 2011/0022812 A1 | 1/2011 | Van Der Linden et al. |
| 2011/0035494 A1 | 2/2011 | Pandey et al. |
| 2011/0040893 A1 | 2/2011 | Karaoguz et al. |
| 2011/0055845 A1 | 3/2011 | Nandagopal et al. |
| 2011/0058563 A1 | 3/2011 | Saraph et al. |
| 2011/0090912 A1 | 4/2011 | Shippy |
| 2011/0164504 A1 | 7/2011 | Bothos et al. |
| 2011/0194563 A1 | 8/2011 | Shen et al. |
| 2011/0211463 A1 | 9/2011 | Matityahu et al. |
| 2011/0225293 A1 | 9/2011 | Rathod |
| 2011/0235508 A1 | 9/2011 | Goel et al. |
| 2011/0261811 A1 | 10/2011 | Battestilli et al. |
| 2011/0268118 A1 | 11/2011 | Schlansker et al. |
| 2011/0271007 A1 | 11/2011 | Wang et al. |
| 2011/0276695 A1 | 11/2011 | Maldaner |
| 2011/0283013 A1 | 11/2011 | Grosser et al. |
| 2011/0295991 A1 | 12/2011 | Aida |
| 2011/0317708 A1* | 12/2011 | Clark .................. H04L 45/50 370/395.1 |
| 2012/0005265 A1 | 1/2012 | Ushioda et al. |
| 2012/0011281 A1 | 1/2012 | Hamada et al. |
| 2012/0014386 A1 | 1/2012 | Xiong et al. |
| 2012/0023231 A1 | 1/2012 | Ueno |
| 2012/0054266 A1 | 3/2012 | Kazerani et al. |
| 2012/0089664 A1 | 4/2012 | Igelka |
| 2012/0110577 A1 | 5/2012 | Chen et al. |
| 2012/0137004 A1 | 5/2012 | Smith |
| 2012/0140719 A1 | 6/2012 | Hui et al. |
| 2012/0144014 A1 | 6/2012 | Natham et al. |
| 2012/0147890 A1 | 6/2012 | Kikuchi |
| 2012/0147894 A1 | 6/2012 | Mulligan et al. |
| 2012/0155266 A1 | 6/2012 | Patel et al. |
| 2012/0176932 A1 | 7/2012 | Wu et al. |
| 2012/0185588 A1 | 7/2012 | Error |
| 2012/0195196 A1 | 8/2012 | Ghai et al. |
| 2012/0207174 A1 | 8/2012 | Shieh |
| 2012/0213074 A1 | 8/2012 | Goldfarb et al. |
| 2012/0230187 A1 | 9/2012 | Tremblay et al. |
| 2012/0239804 A1 | 9/2012 | Liu et al. |
| 2012/0246637 A1 | 9/2012 | Kreeger et al. |
| 2012/0266252 A1 | 10/2012 | Spiers et al. |
| 2012/0281540 A1 | 11/2012 | Khan et al. |
| 2012/0287789 A1 | 11/2012 | Aybay et al. |
| 2012/0303784 A1 | 11/2012 | Zisapel et al. |
| 2012/0303809 A1 | 11/2012 | Patel et al. |
| 2012/0311568 A1 | 12/2012 | Jansen |
| 2012/0317260 A1 | 12/2012 | Husain et al. |
| 2012/0317570 A1 | 12/2012 | Dalcher et al. |
| 2012/0331188 A1 | 12/2012 | Riordan et al. |
| 2013/0003735 A1 | 1/2013 | Chao et al. |
| 2013/0021942 A1 | 1/2013 | Bacthu et al. |
| 2013/0031544 A1 | 1/2013 | Sridharan et al. |
| 2013/0039218 A1 | 2/2013 | Narasimhan et al. |
| 2013/0044636 A1 | 2/2013 | Koponen et al. |
| 2013/0058346 A1 | 3/2013 | Sridharan et al. |
| 2013/0073743 A1 | 3/2013 | Ramasamy et al. |
| 2013/0100851 A1 | 4/2013 | Bacthu et al. |
| 2013/0125120 A1 | 5/2013 | Zhang et al. |
| 2013/0136126 A1 | 5/2013 | Wang et al. |
| 2013/0142048 A1 | 6/2013 | Gross, IV et al. |
| 2013/0148505 A1 | 6/2013 | Koponen et al. |
| 2013/0151661 A1 | 6/2013 | Koponen et al. |
| 2013/0159487 A1 | 6/2013 | Patel et al. |
| 2013/0160024 A1 | 6/2013 | Shtilman et al. |
| 2013/0163594 A1 | 6/2013 | Sharma et al. |
| 2013/0166703 A1 | 6/2013 | Hammer et al. |
| 2013/0170501 A1 | 7/2013 | Egi et al. |
| 2013/0201989 A1 | 8/2013 | Hu et al. |
| 2013/0227097 A1 | 8/2013 | Yasuda et al. |
| 2013/0227550 A1 | 8/2013 | Weinstein et al. |
| 2013/0287026 A1 | 10/2013 | Davie |
| 2013/0287036 A1 | 10/2013 | Banavalikar et al. |
| 2013/0291088 A1 | 10/2013 | Shieh et al. |
| 2013/0297798 A1 | 11/2013 | Arisoylu et al. |
| 2013/0301472 A1 | 11/2013 | Allan |
| 2013/0311637 A1 | 11/2013 | Kamath et al. |
| 2013/0318219 A1 | 11/2013 | Kancherla |
| 2013/0322446 A1 | 12/2013 | Biswas et al. |
| 2013/0332983 A1 | 12/2013 | Koorevaar et al. |
| 2013/0336319 A1 | 12/2013 | Liu et al. |
| 2013/0343174 A1 | 12/2013 | Guichard et al. |
| 2013/0343378 A1 | 12/2013 | Veteikis et al. |
| 2014/0003232 A1 | 1/2014 | Guichard et al. |
| 2014/0003422 A1 | 1/2014 | Mogul et al. |
| 2014/0010085 A1 | 1/2014 | Kavunder et al. |
| 2014/0029447 A1 | 1/2014 | Schrum, Jr. |
| 2014/0046997 A1 | 2/2014 | Dain et al. |
| 2014/0046998 A1 | 2/2014 | Dain et al. |
| 2014/0050223 A1 | 2/2014 | Foo et al. |
| 2014/0052844 A1 | 2/2014 | Nayak et al. |
| 2014/0059204 A1 | 2/2014 | Nguyen et al. |
| 2014/0059544 A1 | 2/2014 | Koganty et al. |
| 2014/0068602 A1 | 3/2014 | Gember et al. |
| 2014/0092738 A1 | 4/2014 | Grandhi et al. |
| 2014/0092906 A1 | 4/2014 | Kandaswamy et al. |
| 2014/0092914 A1 | 4/2014 | Kondapalli |
| 2014/0096183 A1 | 4/2014 | Jain et al. |
| 2014/0101226 A1 | 4/2014 | Khandekar et al. |
| 2014/0101656 A1 | 4/2014 | Zhu et al. |
| 2014/0108665 A1 | 4/2014 | Arora et al. |
| 2014/0115578 A1 | 4/2014 | Cooper et al. |
| 2014/0129715 A1 | 5/2014 | Mortazavi |
| 2014/0149696 A1 | 5/2014 | Frenkel et al. |
| 2014/0164477 A1 | 6/2014 | Springer et al. |
| 2014/0169168 A1 | 6/2014 | Jalan et al. |
| 2014/0169375 A1 | 6/2014 | Khan et al. |
| 2014/0195666 A1 | 7/2014 | Dumitriu et al. |
| 2014/0207968 A1 | 7/2014 | Kumar et al. |
| 2014/0254374 A1 | 9/2014 | Janakiraman et al. |
| 2014/0254591 A1 | 9/2014 | Mahadevan et al. |
| 2014/0269487 A1 | 9/2014 | Kalkunte |
| 2014/0269717 A1 | 9/2014 | Thubert et al. |
| 2014/0269724 A1 | 9/2014 | Mehler et al. |

(56) References Cited

U.S. PATENT DOCUMENTS

| | | |
|---|---|---|
| 2014/0280896 A1 | 9/2014 | Papakostas et al. |
| 2014/0281029 A1 | 9/2014 | Danforth |
| 2014/0282526 A1 | 9/2014 | Basavaiah et al. |
| 2014/0301388 A1 | 10/2014 | Jagadish et al. |
| 2014/0304231 A1 | 10/2014 | Kamath et al. |
| 2014/0307744 A1 | 10/2014 | Dunbar et al. |
| 2014/0310391 A1 | 10/2014 | Sorenson et al. |
| 2014/0310418 A1 | 10/2014 | Sorenson, III et al. |
| 2014/0317677 A1 | 10/2014 | Vaidya et al. |
| 2014/0321459 A1 | 10/2014 | Kumar et al. |
| 2014/0330983 A1 | 11/2014 | Zisapel et al. |
| 2014/0334485 A1 | 11/2014 | Jain et al. |
| 2014/0334488 A1 | 11/2014 | Guichard et al. |
| 2014/0341029 A1 | 11/2014 | Allan et al. |
| 2014/0351452 A1 | 11/2014 | Bosch et al. |
| 2014/0362682 A1 | 12/2014 | Guichard et al. |
| 2014/0362705 A1 | 12/2014 | Pan |
| 2014/0369204 A1 | 12/2014 | Anand et al. |
| 2014/0372567 A1 | 12/2014 | Ganesh et al. |
| 2014/0372616 A1 | 12/2014 | Arisoylu et al. |
| 2014/0372702 A1 | 12/2014 | Subramanyam et al. |
| 2015/0003453 A1 | 1/2015 | Sengupta et al. |
| 2015/0003455 A1 | 1/2015 | Haddad et al. |
| 2015/0009995 A1 | 1/2015 | Gross, IV et al. |
| 2015/0016279 A1 | 1/2015 | Zhang et al. |
| 2015/0023354 A1 | 1/2015 | Li et al. |
| 2015/0026345 A1 | 1/2015 | Ravinoothala et al. |
| 2015/0026362 A1 | 1/2015 | Guichard et al. |
| 2015/0030024 A1 | 1/2015 | Venkataswami et al. |
| 2015/0052262 A1 | 2/2015 | Chanda et al. |
| 2015/0052522 A1 | 2/2015 | Chanda et al. |
| 2015/0063102 A1 | 3/2015 | Mestery et al. |
| 2015/0063364 A1 | 3/2015 | Thakkar et al. |
| 2015/0071285 A1 | 3/2015 | Kumar et al. |
| 2015/0071301 A1 | 3/2015 | Dalal |
| 2015/0073967 A1 | 3/2015 | Katsuyama et al. |
| 2015/0078384 A1 | 3/2015 | Jackson et al. |
| 2015/0092551 A1 | 4/2015 | Moisand et al. |
| 2015/0092564 A1 | 4/2015 | Aldrin |
| 2015/0103645 A1 | 4/2015 | Shen et al. |
| 2015/0103679 A1 | 4/2015 | Tessmer et al. |
| 2015/0103827 A1 | 4/2015 | Quinn et al. |
| 2015/0106802 A1 | 4/2015 | Ivanov et al. |
| 2015/0109901 A1 | 4/2015 | Tan et al. |
| 2015/0124608 A1 | 5/2015 | Agarwal et al. |
| 2015/0124622 A1 | 5/2015 | Kovvali et al. |
| 2015/0124815 A1 | 5/2015 | Beliveau et al. |
| 2015/0124840 A1 | 5/2015 | Bergeron |
| 2015/0138973 A1 | 5/2015 | Kumar et al. |
| 2015/0139041 A1 | 5/2015 | Bosch et al. |
| 2015/0146539 A1 | 5/2015 | Mehta et al. |
| 2015/0156035 A1* | 6/2015 | Foo ................... H04L 12/4645 370/392 |
| 2015/0188770 A1 | 7/2015 | Naiksatam et al. |
| 2015/0195197 A1 | 7/2015 | Yong et al. |
| 2015/0213087 A1 | 7/2015 | Sikri |
| 2015/0215819 A1 | 7/2015 | Bosch et al. |
| 2015/0222640 A1 | 8/2015 | Kumar et al. |
| 2015/0236948 A1 | 8/2015 | Dunbar et al. |
| 2015/0237013 A1 | 8/2015 | Bansal et al. |
| 2015/0242197 A1 | 8/2015 | Alfonso et al. |
| 2015/0244617 A1 | 8/2015 | Nakil et al. |
| 2015/0263901 A1 | 9/2015 | Kumar et al. |
| 2015/0263946 A1 | 9/2015 | Tubaltsev et al. |
| 2015/0271102 A1 | 9/2015 | Antich |
| 2015/0280959 A1 | 10/2015 | Vincent |
| 2015/0281089 A1 | 10/2015 | Marchetti |
| 2015/0281098 A1 | 10/2015 | Pettit et al. |
| 2015/0281125 A1 | 10/2015 | Koponen et al. |
| 2015/0281179 A1 | 10/2015 | Raman et al. |
| 2015/0281180 A1 | 10/2015 | Raman et al. |
| 2015/0288671 A1 | 10/2015 | Chan et al. |
| 2015/0288679 A1 | 10/2015 | Ben-Nun et al. |
| 2015/0295831 A1 | 10/2015 | Kumar et al. |
| 2015/0319078 A1 | 11/2015 | Lee et al. |
| 2015/0319096 A1 | 11/2015 | Yip et al. |
| 2015/0358235 A1 | 12/2015 | Zhang et al. |
| 2015/0358294 A1 | 12/2015 | Kancharla et al. |
| 2015/0365322 A1 | 12/2015 | Shatzkamer et al. |
| 2015/0370586 A1 | 12/2015 | Cooper et al. |
| 2015/0370596 A1 | 12/2015 | Fahs et al. |
| 2015/0372840 A1 | 12/2015 | Benny et al. |
| 2015/0372911 A1 | 12/2015 | Yabusaki et al. |
| 2015/0379277 A1 | 12/2015 | Thota et al. |
| 2015/0381493 A1 | 12/2015 | Bansal et al. |
| 2015/0381494 A1 | 12/2015 | Cherian et al. |
| 2015/0381495 A1 | 12/2015 | Cherian et al. |
| 2016/0006654 A1 | 1/2016 | Fernando et al. |
| 2016/0028640 A1 | 1/2016 | Zhang et al. |
| 2016/0043901 A1 | 2/2016 | Sankar et al. |
| 2016/0043952 A1 | 2/2016 | Zhang et al. |
| 2016/0057050 A1 | 2/2016 | Ostrom et al. |
| 2016/0057687 A1 | 2/2016 | Horn et al. |
| 2016/0065503 A1 | 3/2016 | Yohe et al. |
| 2016/0080253 A1 | 3/2016 | Wang et al. |
| 2016/0087888 A1 | 3/2016 | Jain et al. |
| 2016/0094384 A1 | 3/2016 | Jain et al. |
| 2016/0094389 A1 | 3/2016 | Jain et al. |
| 2016/0094451 A1 | 3/2016 | Jain et al. |
| 2016/0094452 A1 | 3/2016 | Jain et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094457 A1 | 3/2016 | Jain et al. |
| 2016/0094631 A1 | 3/2016 | Jain et al. |
| 2016/0094632 A1 | 3/2016 | Jain et al. |
| 2016/0094633 A1 | 3/2016 | Jain et al. |
| 2016/0094642 A1 | 3/2016 | Jain et al. |
| 2016/0094643 A1 | 3/2016 | Jain et al. |
| 2016/0094661 A1 | 3/2016 | Jain et al. |
| 2016/0099948 A1 | 4/2016 | Ott et al. |
| 2016/0105333 A1 | 4/2016 | Lenglet et al. |
| 2016/0119226 A1 | 4/2016 | Guichard et al. |
| 2016/0127306 A1 | 5/2016 | Wang et al. |
| 2016/0127564 A1 | 5/2016 | Sharma et al. |
| 2016/0134528 A1 | 5/2016 | Lin et al. |
| 2016/0149784 A1 | 5/2016 | Zhang et al. |
| 2016/0149816 A1 | 5/2016 | Roach et al. |
| 2016/0149828 A1 | 5/2016 | Vijayan et al. |
| 2016/0162320 A1 | 6/2016 | Singh et al. |
| 2016/0164776 A1 | 6/2016 | Biancaniello |
| 2016/0164787 A1 | 6/2016 | Roach et al. |
| 2016/0164826 A1 | 6/2016 | Riedel et al. |
| 2016/0173373 A1 | 6/2016 | Guichard et al. |
| 2016/0182684 A1 | 6/2016 | Connor et al. |
| 2016/0197831 A1 | 7/2016 | Foy et al. |
| 2016/0197839 A1 | 7/2016 | Li et al. |
| 2016/0203817 A1 | 7/2016 | Formhals et al. |
| 2016/0205015 A1 | 7/2016 | Halligan et al. |
| 2016/0212048 A1 | 7/2016 | Kaempfer et al. |
| 2016/0212237 A1 | 7/2016 | Nishijima |
| 2016/0218918 A1 | 7/2016 | Chu et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0232019 A1 | 8/2016 | Shah et al. |
| 2016/0248685 A1 | 8/2016 | Pignataro et al. |
| 2016/0277210 A1 | 9/2016 | Lin et al. |
| 2016/0277294 A1 | 9/2016 | Akiyoshi |
| 2016/0294612 A1 | 10/2016 | Ravinoothala et al. |
| 2016/0294933 A1 | 10/2016 | Hong et al. |
| 2016/0294935 A1 | 10/2016 | Hong et al. |
| 2016/0308758 A1 | 10/2016 | Li et al. |
| 2016/0308961 A1 | 10/2016 | Rao |
| 2016/0337189 A1 | 11/2016 | Liebhart et al. |
| 2016/0337249 A1 | 11/2016 | Zhang et al. |
| 2016/0337317 A1 | 11/2016 | Hwang et al. |
| 2016/0344565 A1 | 11/2016 | Batz et al. |
| 2016/0344621 A1 | 11/2016 | Roeland et al. |
| 2016/0344803 A1 | 11/2016 | Batz et al. |
| 2016/0352866 A1 | 12/2016 | Gupta et al. |
| 2016/0366046 A1 | 12/2016 | Anantharam et al. |
| 2016/0373364 A1 | 12/2016 | Yokota |

(56) References Cited

U.S. PATENT DOCUMENTS

| | | |
|---|---|---|
| 2016/0378537 A1 | 12/2016 | Zou |
| 2016/0380812 A1 | 12/2016 | Chanda et al. |
| 2017/0005882 A1 | 1/2017 | Tao et al. |
| 2017/0005920 A1 | 1/2017 | Previdi et al. |
| 2017/0005923 A1 | 1/2017 | Babakian |
| 2017/0005988 A1 | 1/2017 | Bansal et al. |
| 2017/0019303 A1 | 1/2017 | Swamy et al. |
| 2017/0019329 A1 | 1/2017 | Kozat et al. |
| 2017/0019331 A1 | 1/2017 | Yong |
| 2017/0019341 A1 | 1/2017 | Huang et al. |
| 2017/0026417 A1 | 1/2017 | Ermagan et al. |
| 2017/0033939 A1 | 2/2017 | Bragg et al. |
| 2017/0053683 A1 | 2/2017 | Lee et al. |
| 2017/0063928 A1 | 3/2017 | Jain et al. |
| 2017/0064048 A1 | 3/2017 | Pettit et al. |
| 2017/0064749 A1 | 3/2017 | Jain et al. |
| 2017/0078176 A1 | 3/2017 | Lakshmikantha et al. |
| 2017/0078961 A1 | 3/2017 | Rabii et al. |
| 2017/0093698 A1 | 3/2017 | Farmanbar |
| 2017/0093758 A1 | 3/2017 | Chanda |
| 2017/0099194 A1 | 4/2017 | Wei |
| 2017/0126497 A1 | 5/2017 | Dubey et al. |
| 2017/0126522 A1 | 5/2017 | McCann et al. |
| 2017/0126726 A1 | 5/2017 | Han |
| 2017/0134538 A1 | 5/2017 | Mahkonen et al. |
| 2017/0142012 A1 | 5/2017 | Thakkar et al. |
| 2017/0147399 A1 | 5/2017 | Cropper et al. |
| 2017/0149582 A1 | 5/2017 | Cohn et al. |
| 2017/0149675 A1 | 5/2017 | Yang |
| 2017/0149680 A1 | 5/2017 | Liu et al. |
| 2017/0163531 A1 | 6/2017 | Kumar et al. |
| 2017/0163724 A1 | 6/2017 | Puri et al. |
| 2017/0170990 A1 | 6/2017 | Gaddehosur et al. |
| 2017/0171159 A1 | 6/2017 | Kumar et al. |
| 2017/0180240 A1 | 6/2017 | Kern et al. |
| 2017/0195255 A1 | 7/2017 | Pham et al. |
| 2017/0208000 A1 | 7/2017 | Bosch et al. |
| 2017/0208011 A1 | 7/2017 | Bosch et al. |
| 2017/0208532 A1 | 7/2017 | Zhou |
| 2017/0214627 A1 | 7/2017 | Zhang et al. |
| 2017/0220306 A1 | 8/2017 | Price et al. |
| 2017/0230333 A1 | 8/2017 | Glazemakers et al. |
| 2017/0230467 A1 | 8/2017 | Salgueiro et al. |
| 2017/0237656 A1 | 8/2017 | Gage |
| 2017/0250869 A1 | 8/2017 | Voellmy |
| 2017/0250902 A1 | 8/2017 | Rasanen et al. |
| 2017/0250917 A1 | 8/2017 | Ruckstuhl et al. |
| 2017/0251065 A1 | 8/2017 | Furr et al. |
| 2017/0257432 A1 | 9/2017 | Fu et al. |
| 2017/0264677 A1 | 9/2017 | Li |
| 2017/0273099 A1 | 9/2017 | Zhang et al. |
| 2017/0279938 A1 | 9/2017 | You et al. |
| 2017/0295021 A1 | 10/2017 | Gutiérrez et al. |
| 2017/0295033 A1 | 10/2017 | Cherian et al. |
| 2017/0295100 A1 | 10/2017 | Hira et al. |
| 2017/0310588 A1 | 10/2017 | Zuo |
| 2017/0310611 A1 | 10/2017 | Kumar et al. |
| 2017/0317887 A1 | 11/2017 | Dwaraki et al. |
| 2017/0317926 A1 | 11/2017 | Penno et al. |
| 2017/0317936 A1 | 11/2017 | Swaminathan et al. |
| 2017/0317954 A1 | 11/2017 | Masurekar et al. |
| 2017/0317969 A1 | 11/2017 | Masurekar et al. |
| 2017/0318081 A1 | 11/2017 | Hopen et al. |
| 2017/0318097 A1 | 11/2017 | Drew et al. |
| 2017/0324651 A1 | 11/2017 | Penno et al. |
| 2017/0324654 A1 | 11/2017 | Previdi et al. |
| 2017/0331672 A1 | 11/2017 | Fedyk et al. |
| 2017/0339110 A1 | 11/2017 | Ni |
| 2017/0339600 A1 | 11/2017 | Roeland et al. |
| 2017/0346764 A1 | 11/2017 | Tan et al. |
| 2017/0353387 A1 | 12/2017 | Kwak et al. |
| 2017/0359252 A1 | 12/2017 | Kumar et al. |
| 2017/0364287 A1 | 12/2017 | Antony et al. |
| 2017/0364794 A1 | 12/2017 | Mahkonen et al. |
| 2017/0366605 A1 | 12/2017 | Chang et al. |
| 2017/0373990 A1 | 12/2017 | Jeuk et al. |
| 2018/0004954 A1 | 1/2018 | Liguori et al. |
| 2018/0006935 A1 | 1/2018 | Mutnuru et al. |
| 2018/0026911 A1 | 1/2018 | Anholt et al. |
| 2018/0027101 A1 | 1/2018 | Kumar et al. |
| 2018/0041425 A1 | 2/2018 | Zhang |
| 2018/0041470 A1 | 2/2018 | Schultz et al. |
| 2018/0041524 A1 | 2/2018 | Reddy et al. |
| 2018/0063000 A1 | 3/2018 | Wu et al. |
| 2018/0063018 A1 | 3/2018 | Bosch et al. |
| 2018/0063087 A1 | 3/2018 | Hira et al. |
| 2018/0091420 A1 | 3/2018 | Drake et al. |
| 2018/0102919 A1 | 4/2018 | Hao et al. |
| 2018/0102965 A1 | 4/2018 | Hari et al. |
| 2018/0115471 A1 | 4/2018 | Curcio et al. |
| 2018/0123950 A1 | 5/2018 | Garg et al. |
| 2018/0124061 A1 | 5/2018 | Raman et al. |
| 2018/0139098 A1 | 5/2018 | Sunavala et al. |
| 2018/0145899 A1 | 5/2018 | Rao |
| 2018/0159733 A1 | 6/2018 | Poon et al. |
| 2018/0159801 A1 | 6/2018 | Rajan et al. |
| 2018/0159943 A1 | 6/2018 | Poon et al. |
| 2018/0176177 A1 | 6/2018 | Bichot et al. |
| 2018/0176294 A1 | 6/2018 | Vacaro et al. |
| 2018/0183764 A1 | 6/2018 | Gunda |
| 2018/0184281 A1 | 6/2018 | Tamagawa |
| 2018/0191600 A1 | 7/2018 | Hecker et al. |
| 2018/0198692 A1 | 7/2018 | Ansari et al. |
| 2018/0198705 A1 | 7/2018 | Wang et al. |
| 2018/0198791 A1 | 7/2018 | Desai et al. |
| 2018/0203736 A1 | 7/2018 | Vyas et al. |
| 2018/0205637 A1 | 7/2018 | Li |
| 2018/0213040 A1 | 7/2018 | Pak et al. |
| 2018/0219762 A1 | 8/2018 | Wang et al. |
| 2018/0227216 A1 | 8/2018 | Hughes |
| 2018/0234360 A1 | 8/2018 | Narayana et al. |
| 2018/0247082 A1 | 8/2018 | Durham et al. |
| 2018/0248713 A1 | 8/2018 | Zanier et al. |
| 2018/0248755 A1 | 8/2018 | Hecker et al. |
| 2018/0248790 A1 | 8/2018 | Tan et al. |
| 2018/0248986 A1 | 8/2018 | Dalal |
| 2018/0262427 A1 | 9/2018 | Jain et al. |
| 2018/0262434 A1 | 9/2018 | Koponen et al. |
| 2018/0278530 A1 | 9/2018 | Connor et al. |
| 2018/0288129 A1 | 10/2018 | Joshi et al. |
| 2018/0295036 A1 | 10/2018 | Krishnamurthy et al. |
| 2018/0295053 A1 | 10/2018 | Leung et al. |
| 2018/0302242 A1 | 10/2018 | Hao et al. |
| 2018/0309632 A1 | 10/2018 | Kompella et al. |
| 2018/0337849 A1 | 11/2018 | Sharma et al. |
| 2018/0349212 A1 | 12/2018 | Liu et al. |
| 2018/0351874 A1 | 12/2018 | Abhigyan et al. |
| 2018/0375684 A1 | 12/2018 | Filsfils et al. |
| 2019/0007382 A1 | 1/2019 | Nirwal et al. |
| 2019/0020580 A1 | 1/2019 | Boutros et al. |
| 2019/0020600 A1 | 1/2019 | Zhang et al. |
| 2019/0020684 A1 | 1/2019 | Qian et al. |
| 2019/0028347 A1 | 1/2019 | Johnston et al. |
| 2019/0028384 A1 | 1/2019 | Penno et al. |
| 2019/0028577 A1 | 1/2019 | D?Souza et al. |
| 2019/0036819 A1 | 1/2019 | Kancherla et al. |
| 2019/0068500 A1 | 2/2019 | Hira |
| 2019/0089679 A1 | 3/2019 | Kahalon et al. |
| 2019/0097838 A1 | 3/2019 | Sahoo et al. |
| 2019/0102280 A1 | 4/2019 | Caldato et al. |
| 2019/0108049 A1 | 4/2019 | Singh et al. |
| 2019/0116063 A1 | 4/2019 | Bottorff et al. |
| 2019/0121961 A1 | 4/2019 | Coleman et al. |
| 2019/0124096 A1 | 4/2019 | Ahuja et al. |
| 2019/0132220 A1 | 5/2019 | Boutros et al. |
| 2019/0132221 A1 | 5/2019 | Boutros et al. |
| 2019/0140863 A1 | 5/2019 | Nainar et al. |
| 2019/0140947 A1 | 5/2019 | Zhuang et al. |
| 2019/0140950 A1 | 5/2019 | Zhuang et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0166045 A1 | 5/2019 | Peng et al. |
| 2019/0173778 A1 | 6/2019 | Faseela et al. |

(56) References Cited

U.S. PATENT DOCUMENTS

| | | |
|---|---|---|
| 2019/0173850 A1 | 6/2019 | Jain et al. |
| 2019/0173851 A1 | 6/2019 | Jain et al. |
| 2019/0222538 A1 | 7/2019 | Yang et al. |
| 2019/0229937 A1 | 7/2019 | Nagarajan et al. |
| 2019/0230126 A1 | 7/2019 | Kumar et al. |
| 2019/0238363 A1 | 8/2019 | Boutros et al. |
| 2019/0238364 A1 | 8/2019 | Boutros et al. |
| 2019/0268384 A1 | 8/2019 | Hu et al. |
| 2019/0286475 A1 | 9/2019 | Mani |
| 2019/0288915 A1 | 9/2019 | Denyer et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0342175 A1 | 11/2019 | Wan et al. |
| 2019/0377604 A1 | 12/2019 | Cybulski |
| 2019/0379578 A1 | 12/2019 | Mishra et al. |
| 2019/0379579 A1 | 12/2019 | Mishra et al. |
| 2020/0007388 A1 | 1/2020 | Johnston et al. |
| 2020/0036629 A1 | 1/2020 | Roeland et al. |
| 2020/0059761 A1 | 2/2020 | Li et al. |
| 2020/0067828 A1 | 2/2020 | Liu et al. |
| 2020/0073739 A1 | 3/2020 | Rungta et al. |
| 2020/0076684 A1 | 3/2020 | Naveen et al. |
| 2020/0076734 A1 | 3/2020 | Naveen et al. |
| 2020/0084141 A1 | 3/2020 | Bengough et al. |
| 2020/0084147 A1 | 3/2020 | Gandhi et al. |
| 2020/0136960 A1 | 4/2020 | Jeuk et al. |
| 2020/0145331 A1 | 5/2020 | Bhandari et al. |
| 2020/0162318 A1 | 5/2020 | Patil et al. |
| 2020/0162352 A1 | 5/2020 | Jorgenson et al. |
| 2020/0183724 A1 | 6/2020 | Shevade et al. |
| 2020/0195711 A1 | 6/2020 | Abhigyan et al. |
| 2020/0204492 A1 | 6/2020 | Sarva et al. |
| 2020/0213366 A1 | 7/2020 | Tong et al. |
| 2020/0220805 A1 | 7/2020 | Dhanabalan |
| 2020/0272493 A1 | 8/2020 | Lecuyer et al. |
| 2020/0272494 A1 | 8/2020 | Gokhale et al. |
| 2020/0272495 A1 | 8/2020 | Rolando et al. |
| 2020/0272496 A1 | 8/2020 | Mundaragi et al. |
| 2020/0272497 A1 | 8/2020 | Kavathia et al. |
| 2020/0272498 A1 | 8/2020 | Mishra et al. |
| 2020/0272499 A1 | 8/2020 | Feng et al. |
| 2020/0272500 A1 | 8/2020 | Feng et al. |
| 2020/0272501 A1 | 8/2020 | Chalvadi et al. |
| 2020/0274757 A1 | 8/2020 | Rolando et al. |
| 2020/0274769 A1 | 8/2020 | Naveen et al. |
| 2020/0274778 A1 | 8/2020 | Lecuyer et al. |
| 2020/0274779 A1 | 8/2020 | Rolando et al. |
| 2020/0274795 A1 | 8/2020 | Rolando et al. |
| 2020/0274801 A1 | 8/2020 | Feng et al. |
| 2020/0274808 A1 | 8/2020 | Mundaragi et al. |
| 2020/0274809 A1 | 8/2020 | Rolando et al. |
| 2020/0274810 A1 | 8/2020 | Gokhale et al. |
| 2020/0274826 A1 | 8/2020 | Mishra et al. |
| 2020/0274944 A1 | 8/2020 | Naveen et al. |
| 2020/0274945 A1 | 8/2020 | Rolando et al. |
| 2020/0287962 A1 | 9/2020 | Mishra et al. |
| 2020/0322271 A1 | 10/2020 | Jain et al. |
| 2020/0344088 A1 | 10/2020 | Selvaraj et al. |
| 2020/0358696 A1 | 11/2020 | Hu et al. |
| 2020/0364074 A1 | 11/2020 | Gunda et al. |
| 2020/0366526 A1 | 11/2020 | Boutros et al. |
| 2020/0366584 A1 | 11/2020 | Boutros et al. |
| 2020/0382412 A1 | 12/2020 | Chandrappa et al. |
| 2020/0382420 A1 | 12/2020 | Suryanarayana et al. |
| 2020/0389401 A1 | 12/2020 | Enguehard et al. |
| 2021/0004245 A1 | 1/2021 | Kamath et al. |
| 2021/0011812 A1 | 1/2021 | Mitkar et al. |
| 2021/0011816 A1 | 1/2021 | Mitkar et al. |
| 2021/0029088 A1 | 1/2021 | Mayya et al. |
| 2021/0044502 A1 | 2/2021 | Boutros et al. |
| 2021/0067439 A1 | 3/2021 | Kommula et al. |
| 2021/0073736 A1 | 3/2021 | Alawi et al. |
| 2021/0117217 A1 | 4/2021 | Croteau et al. |
| 2021/0120080 A1 | 4/2021 | Mishra et al. |
| 2021/0135992 A1 | 5/2021 | Tidemann et al. |
| 2021/0136140 A1 | 5/2021 | Tidemann et al. |
| 2021/0136141 A1 | 5/2021 | Tidemann et al. |
| 2021/0136147 A1 | 5/2021 | Giassa et al. |
| 2021/0218587 A1 | 7/2021 | Mishra et al. |
| 2021/0227041 A1 | 7/2021 | Sawant et al. |
| 2021/0227042 A1 | 7/2021 | Sawant et al. |
| 2021/0240734 A1 | 8/2021 | Shah et al. |
| 2021/0266295 A1 | 8/2021 | Stroz |
| 2021/0271565 A1 | 9/2021 | Bhavanarushi et al. |
| 2021/0306240 A1 | 9/2021 | Boutros et al. |
| 2021/0311758 A1 | 10/2021 | Cao et al. |
| 2021/0311772 A1 | 10/2021 | Mishra et al. |
| 2021/0314248 A1 | 10/2021 | Rolando et al. |
| 2021/0314252 A1 | 10/2021 | Rolando et al. |
| 2021/0314253 A1 | 10/2021 | Rolando et al. |
| 2021/0314268 A1 | 10/2021 | Rolando et al. |
| 2021/0314277 A1 | 10/2021 | Rolando et al. |
| 2021/0314310 A1 | 10/2021 | Cao et al. |
| 2021/0314415 A1 | 10/2021 | Rolando et al. |
| 2021/0314423 A1 | 10/2021 | Rolando et al. |
| 2021/0328913 A1 | 10/2021 | Nainar et al. |
| 2021/0349767 A1 | 11/2021 | Asayag et al. |
| 2021/0359945 A1 | 11/2021 | Jain et al. |
| 2021/0377160 A1 | 12/2021 | Faseela |
| 2022/0019698 A1 | 1/2022 | Durham et al. |
| 2022/0030058 A1 | 1/2022 | Tidemann et al. |
| 2022/0038310 A1 | 2/2022 | Boutros et al. |
| 2022/0060467 A1 | 2/2022 | Montgomery et al. |
| 2022/0078037 A1 | 3/2022 | Mishra et al. |
| 2022/0188140 A1 | 6/2022 | Jain et al. |
| 2022/0191304 A1 | 6/2022 | Jain et al. |
| 2023/0052818 A1 | 2/2023 | Jain et al. |
| 2023/0168917 A1 | 6/2023 | Kavathia et al. |
| 2023/0179474 A1 | 6/2023 | Naveen et al. |

FOREIGN PATENT DOCUMENTS

| | | |
|---|---|---|
| CN | 1689369 A | 10/2005 |
| CN | 101594358 A | 12/2009 |
| CN | 101729412 A | 6/2010 |
| CN | 103516807 A | 1/2014 |
| CN | 103795805 A | 5/2014 |
| CN | 104471899 A | 3/2015 |
| CN | 104521195 A | 4/2015 |
| CN | 105706420 A | 6/2016 |
| CN | 106134137 A | 11/2016 |
| CN | 107005584 A | 8/2017 |
| CN | 107078950 A | 8/2017 |
| CN | 107113208 A | 8/2017 |
| CN | 107204941 A | 9/2017 |
| CN | 107210959 A | 9/2017 |
| CN | 109213573 A | 1/2019 |
| CN | 110521169 A | 11/2019 |
| CN | 107105061 B | 9/2020 |
| CN | 112181632 A | 1/2021 |
| EP | 2426956 A1 | 3/2012 |
| EP | 2466985 A1 | 6/2012 |
| EP | 3210345 A1 | 8/2017 |
| EP | 3300319 A1 | 3/2018 |
| JP | 2005311863 A | 11/2005 |
| JP | 2015519822 A | 7/2015 |
| WO | 9918534 A2 | 4/1999 |
| WO | 2008095010 A1 | 8/2008 |
| WO | 2014069978 A1 | 5/2014 |
| WO | 2014182529 A1 | 11/2014 |
| WO | 2014207725 A1 | 12/2014 |
| WO | 2016053373 A1 | 4/2016 |
| WO | 2016054272 A1 | 4/2016 |
| WO | 2019084066 A1 | 5/2019 |
| WO | 2019147316 A1 | 8/2019 |
| WO | 2019157955 A1 | 8/2019 |
| WO | 2019168532 A1 | 9/2019 |
| WO | 2019226327 A1 | 11/2019 |
| WO | 2020046686 A1 | 3/2020 |
| WO | 2020171937 A1 | 8/2020 |
| WO | 2021041440 A1 | 3/2021 |

(56) References Cited

FOREIGN PATENT DOCUMENTS

| WO | 2021086462 A1 | 5/2021 |
|---|---|---|
| WO | 2021206789 A1 | 10/2021 |
| WO | 2022132308 A1 | 6/2022 |

OTHER PUBLICATIONS

Li, Qing-Gu, "Network Virtualization of Data Center Security," Information Security and Technology, Oct. 2012, 3 pages.

Author Unknown, "Datagram," Jun. 22, 2012, 2 pages, retrieved from https://web.archive.org/web/20120622031055/https://en.wikipedia.org/wiki/datagram.

Author Unknown, "MPLS," Mar. 3, 2008, 47 pages.

Author Unknown, "AppLogic Features," Jul. 2007, 2 pages, 3TERA, Inc.

Author Unknown, "Enabling Service Chaining on Cisco Nexus 1000V Series," Month Unknown, 2012, 25 pages, Cisco.

Casado, Martin, et al., "Virtualizing the Network Forwarding Plane," Dec. 2010, 6 pages.

Cianfrani, Antonio, et al., "Translating Traffic Engineering Outcome into Segment Routing Paths: the Encoding Problem," 2016 IEEE Conference on Computer Communications Workshops (INFOCOM Wkshps): GI 2016: 9th IEEE Global Internet Symposium, Apr. 10-14, 2016, 6 pages, IEEE, San Francisco, CA, USA.

Dixon, Colin, et al., "An End to the Middle," Proceedings of the 12th Conference on Hot Topics in Operating Systems, May 2009, 5 pages, USENIX Association, Berkeley, CA, USA.

Dumitriu, Dan Mihai, et al., U.S. Appl. No. 61/514,990, filed Aug. 4, 2011, 31 pages.

Greenberg, Albert, et al., "VL2: A Scalable and Flexible Data Center Network," SIGCOMM '09, Aug. 17-21, 2009, 12 pages, ACM, Barcelona, Spain.

Guichard, J., et al., "Network Service Chaining Problem Statement," Network Working Group, Jun. 13, 2013, 14 pages, Cisco Systems, Inc.

Halpern, J., et al., "Service Function Chaining (SFC) Architecture," draft-ietf-sfc-architecture-02, Sep. 20, 2014, 26 pages, IETF.

Halpern, J., et al., "Service Function Chaining (SFC) Architecture," RFC 7665, Oct. 2015, 32 pages, IETF Trust.

Joseph, Dilip Anthony, et al., "A Policy-aware Switching Layer for Data Centers," Jun. 24, 2008, 26 pages, Electrical Engineering and Computer Sciences, University of California, Berkeley, CA, USA.

Karakus, Murat, et al., "Quality of Service (QoS) in Software Defined Networking (SDN): A Survey," Journal of Network and Computer Applications, Dec. 9, 2016, 19 pages, vol. 80, Elsevier, Ltd.

Kumar, S., et al., "Service Function Chaining Use Cases in Data Centers," draft-ietf-sfc-dc-use-cases-01, Jul. 21, 2014, 23 pages, IETF.

Lin, Po-Ching, et al., "Balanced Service Chaining in Software-Defined Networks with Network Function Virtualization," Computer: Research Feature, Nov. 2016, 9 pages, vol. 49, No. 11, IEEE.

Liu, W., et al., "Service Function Chaining (SFC) Use Cases," draft-liu-sfc-use-cases-02, Feb. 13, 2014, 17 pages, IETF.

PCT International Search Report and Written Opinion for commonly owned International Patent Application PCT/US2014/036275, dated Sep. 25, 2014, 10 pages, International Searching Authority (EPO).

Salsano, Stefano, et al., "Generalized Virtual Networking: An Enabler for Service Centric Networking and Network Function Virtualization," 2014 16th International Telecommunications Network Strategy and Planning Symposium, Sep. 17-19, 2014, 7 pages, IEEE, Funchal, Portugal.

Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.

Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

Siasi, N., et al., "Container-Based Service Function Chain Mapping," 2019 SoutheastCon, Apr. 11-14, 2019, 6 pages, IEEE, Huntsville, AL, USA.

Xiong, Gang, et al., "A Mechanism for Configurable Network Service Chaining and Its Implementation," KSII Transactions on Internet and Information Systems, Aug. 2016, 27 pages, vol. 10, No. 8, KSII.

\* cited by examiner

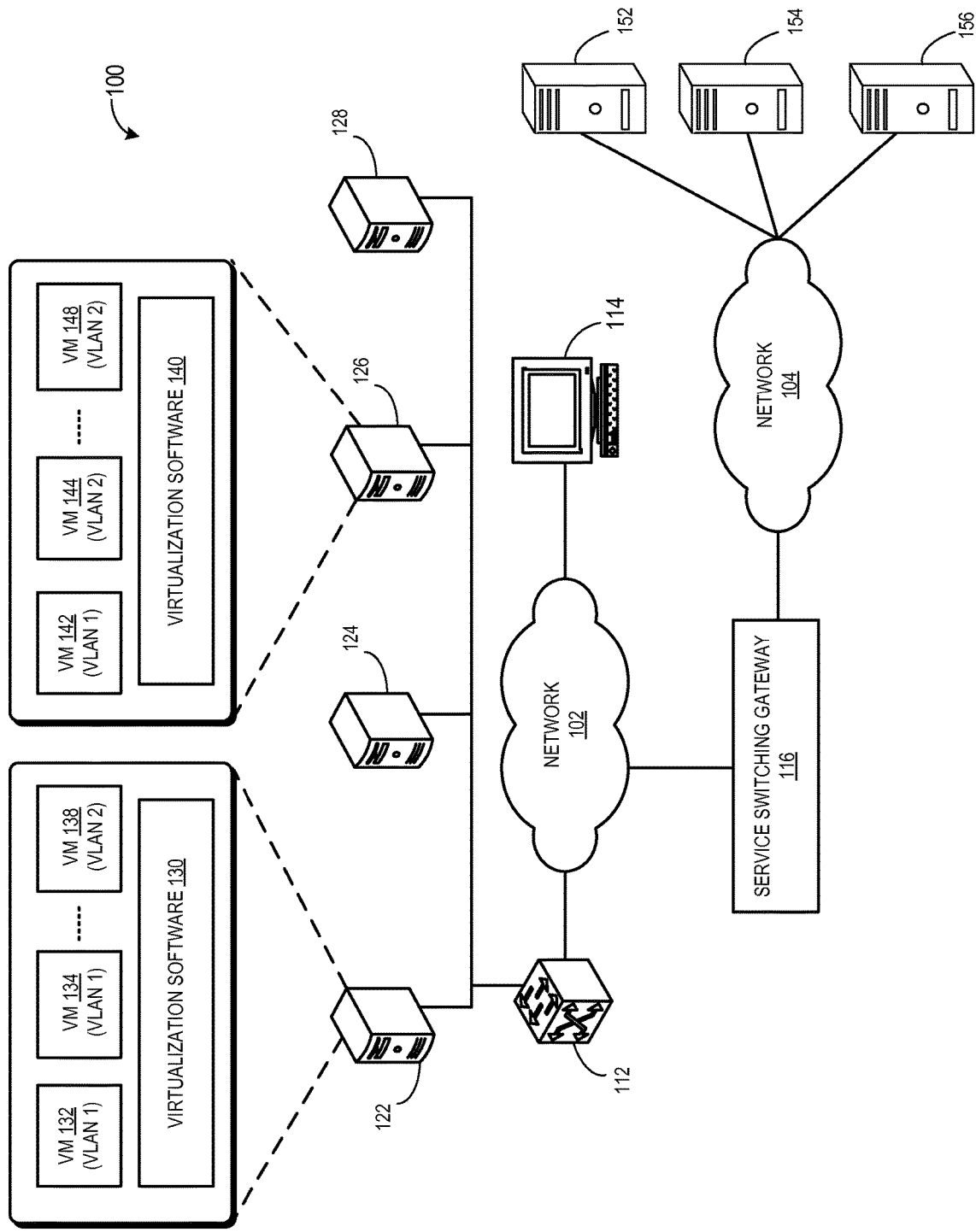

METHOD AND SYSTEM FOR SERVICE SWITCHING USING SERVICE TAGS

CLAIM OF BENEFIT TO PRIOR APPLICATIONS

This application is a continuation application of U.S. patent application Ser. No. 16/905,909, filed Jun. 18, 2020, now issued as U.S. Pat. No. 11,438,267. U.S. patent application Ser. No. 16/905,909 is a continuation application of U.S. patent application Ser. No. 15/973,487, filed May 7, 2018, now issued as U.S. Pat. No. 10,693,782. U.S. patent application Ser. No. 15/973,487 is a continuation application of U.S. patent application Ser. No. 14/960,441, filed Dec. 7, 2015, now issued as U.S. Pat. No. 9,979,641. U.S. patent application Ser. No. 14/960,441 is a continuation application of U.S. patent application Ser. No. 13/891,025, filed May 9, 2013, now issued as U.S. Pat. No. 9,225,638. U.S. Pat. Nos. 11,438,267, 10,693,782, 9,979,641 and 9,225,638 are incorporated herein by reference.

BACKGROUND

The exponential growth of the Internet has made it a ubiquitous delivery medium for a variety of applications. Such applications, in turn, have brought with them an increasing demand for bandwidth. As a result, service providers race to build larger and faster data centers with versatile capabilities. Meanwhile, advances in virtualization technologies have made it possible to implement a large number of virtual machines (VMs) in a data center. These virtual machines can essentially operate as physical hosts and perform a variety of functions such as Web or database servers. Because virtual machines are implemented in software, virtual machines for different customer can coexist in the same physical host. This multi-tenancy capability allows service providers to partition and isolate physical resources (e.g., computing power and network capacity) according to customer needs, and to allocate such resources dynamically.

While virtualization brings unprecedented flexibility to service providers, the conventional multi-tenancy tends to be rigid and cannot readily accommodate the dynamic nature of traffic generated by virtual machines. For example, efficiently addressing diverse service requirements of traffic from a plurality of multi-tenant customers (or clients) with different service requirements can be challenging. To obtain service for its traffic, a virtual machine typically interacts with one or more physical or virtual equipments (can be referred to as service portals). A service portal can provide specific networking services, such as load balancing and firewall service etc, and application services, such as web proxy, mail proxy, authentication proxy, web caching, content proxy etc. In conventional datacenter environments, this interaction can be enabled by configuring the services at several management stations in the network.

One or more service portals can provide a service within or outside of the datacenter environment. Consequently, the network infrastructure comprising switches and routers in the datacenter environment requires service switching for multiple services to reach the desired portals. Service switching refers to the switching of a packet based on its service requirements to a service portal. With today's dynamic nature of the datacenter service and policy deployment, such service switching is an increasingly difficult task.

Because of multi-tenancy, the same network infrastructure is used for forwarding traffic flow belonging to different clients. Traffic for a respective client can be originated from a number of applications running on different virtual machines. Furthermore, different clients may require the network infrastructure to forward traffic belonging to the same application differently. For example, in a multi-tenant environment, the network infrastructure may need to forward web traffic from one client to a web filtering service portal while bypassing web filtering for a second client. In a conventional datacenter, the ability to switch traffic based on the corresponding requested services is typically based on static routing policies toward appliances dedicated for services in the network infrastructure. Consequently, managing and extensive provisioning of individual devices in a network infrastructure to accommodate such diverse service requirements can be tedious and error-prone.

SUMMARY

The disclosure herein describes a system, which provides service switching in a datacenter environment. During operation, the system identifies a source client and a requested service of a received packet and generates a service tag indicating the source client, the requested service, or both. The system forwards the packet and the service tag toward a service switching gateway, thereby allowing the service switching gateway to switch the packet based on the service tag. The system can encapsulate the packet based on the identified source client and the requested service of the packet, incorporates the service tag in the packet encapsulation, and forwards the packet is based on the encapsulation.

The system can include a service switching gateway, which can identify a service tag associated with a received packet. During operation, the service switching gateway determines a source client, a requested service, or both for the packet based on the service tag, identifies a corresponding service portal based on the service tag, and forwards the packet toward the service portal. The service switching gateway can optionally maintain a mapping between the service tag and one or more of: a source client, a requested service, the service portal, and a tunnel encapsulation. The service switching gateway can encapsulate the packet based on an encapsulation mechanism supported by the service portal and forward the packet based on the mapping.

Additionally, upon providing the service to the packet, the service portal can forward the packet back to the service switching gateway. The service switching gateway receives the packet, reconstructs the service tag for the packet, and forwards the packet back to its origination switch. The system can use Generic Routing Encapsulation (GRE) tunneling, Internet Protocol Security (IPsec) tunneling, Virtual Local Area Network (VLAN) encapsulation, and/or Internet Protocol (IP) for encapsulation. The system uses a GRE key, an IPsec Security Parameter Index (SPI), a VLAN tag, and/or IP header options as the corresponding service tag.

BRIEF DESCRIPTION OF FIGURES

FIG. 1A illustrates an exemplary datacenter environment that facilitates dynamic service switching.

In the figures, like reference numerals refer to the same figure elements.

DETAILED DESCRIPTION

Figure 1B:
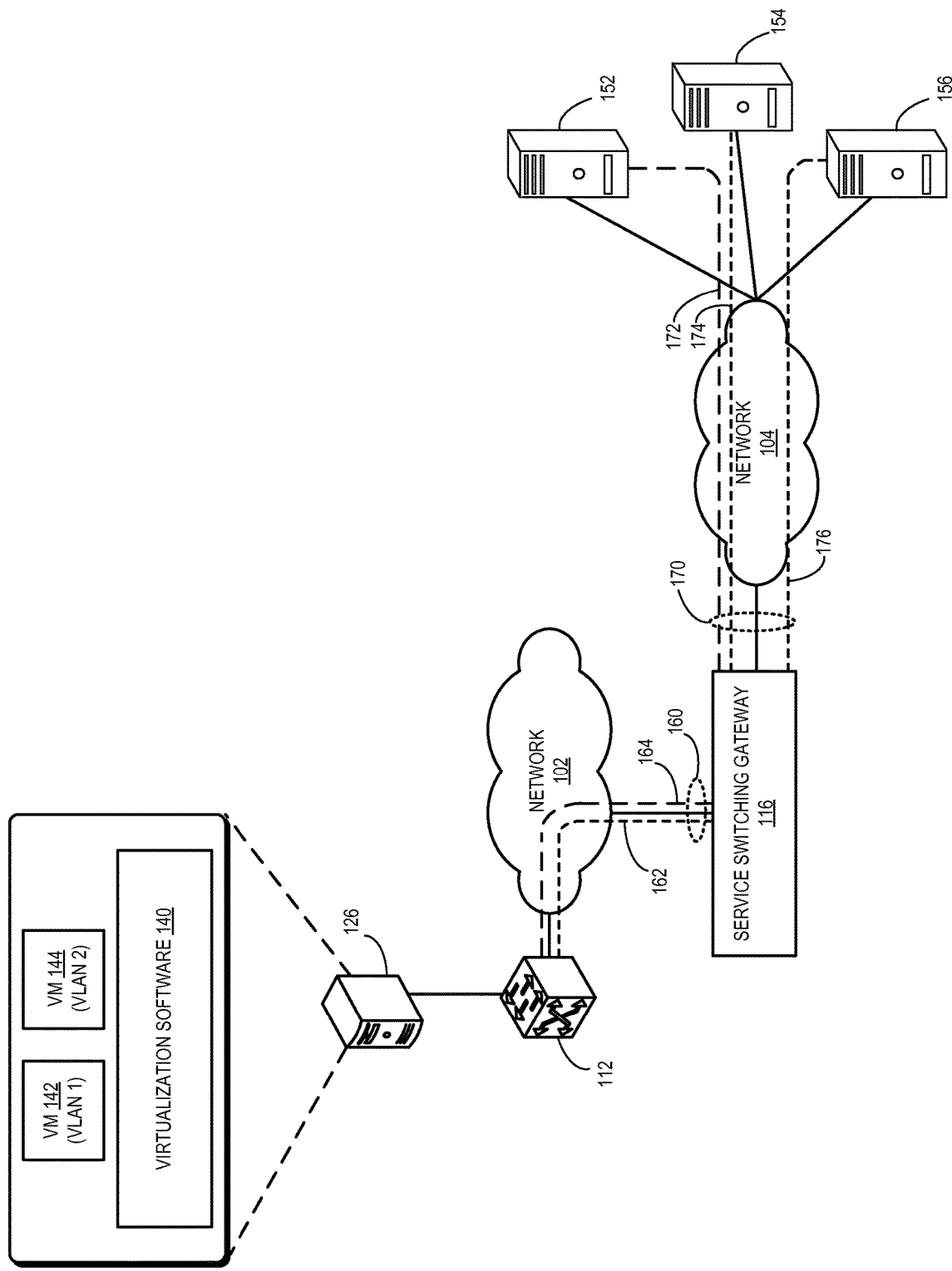
FIG. 1B illustrates encapsulation-based dynamic service switching in conjunction with the example in FIG. 1A.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Embodiments of the system disclosed herein solve the problem of dynamically facilitating services to a packet in a multitenant datacenter environment by attaching a service tag to the packet based on its service requirements and switching the packet using the service tag. Because of multi-tenancy, the same network infrastructure of the datacenter environment is used to forward traffic flow belonging to different clients. With existing technologies, standard network protocol stack (e.g., layer-2 and layer-3 of the stack) is typically used by a client in a multi-tenant datacenter environment. For example, the client typically uses its own virtual local area network (VLAN) and Internet Protocol (IP) sub-network (subnet) corresponding to a specific range of IP addresses. As a result, the network protocol stack may not be available for associating virtual machines of different clients with different service requirements. Because different services can be provided from different service portals within or outside of the datacenter, the network infrastructure of the datacenter is burdened with selecting the appropriate service portal. Managing individual devices in the network infrastructure to accommodate such diverse service provisioning can be tedious and error-prone.

To solve this problem, a respective packet in a datacenter environment is associated with a service tag which indicates the source client of the packet and/or the service the packet requires. The client to which the originating virtual machine of the packet belongs is the source client of the packet. In some embodiments, upon receiving the packet, a switch, which can be the first-hop switch, determines the source client, and the requested service and creates the service tag. The switch then encapsulates the packet, includes the service tag as a part of the encapsulation, and sends the encapsulated packet to a service switching gateway. Because this switch originates the service switching in the datacenter environment, the switch can be referred to as the origination switch. The service switching gateway uses the service tag to identify service portal capable of providing the requested service to the packet. In some embodiments, the encapsulation is based on a generic encapsulation mechanism. Upon receiving the packet and the service tag, the service switching gateway decapsulates the packet, identifies the source client and the requested service from the service tag, and forwards the packet to a service portal based on the determination. In some embodiments, the service switching gateway can use a generic encapsulation mechanism to forward the packet to a service portal.

FIG. 1A illustrates an exemplary datacenter environment that facilitates dynamic service switching. Datacenter environment 100 includes a number of host machines 122, 124, 126, and 128. A respective host machine can host a plurality of virtual machines running on virtualization software. For example, host machine 122 and 126 run virtualization software 130 and 140, respectively. A number of virtual machines 132, 134, and 138 run on virtualization software 130, and a number of virtual machines 142, 144, and 148 run on virtualization software 140. In this example, virtual machines 132, 134, and 142 belong to VLAN 1, which is associated with one customer, and virtual machines 138, 144, and 148 belong to VLAN 2, which is associated with another customer.

Datacenter environment 100 also includes a policy server 114, which allows a network administrator to provide service policies regarding different clients and the requested services for different traffic flow type from a respective client. Policy server 114 sends these service policies to an origination switch 112 and a service switching gateway 116 via network 102. In this example, originating switch 112 operates as the origination point of service switching in datacenter environment 100. Note that virtualization software 130 and 140, and/or any networking device in network 102 can operate as an origination point of service switching in datacenter environment 100. Service switching gateway 116 is coupled to service portals 152, 154, and 156 via network 104.

Networks 102 and 104 can be local or wide area networks comprising layer-2 (e.g., Ethernet), layer-3 (e.g., IP), and/or any other networking layers. In some embodiments, networks 102 and 104 are parts of the same network (e.g., same local or wide area network). Based on the service policies received from policy server 114, switch 112 configures forwarding policies by determining which traffic flow type (e.g., web, mail, file transfer, etc) from a client requires which service. Similarly, based on the service policies, service switching gateway 116 configures service switching policies by determining which service portal should the traffic flow be directed to.

During operation, virtual machine 132 generates a packet. The term "packet" refers to a group of bits that can be transported together across a network. "Packet" should not be interpreted as limiting embodiments of the present invention to any specific networking layer. "Packet" can be replaced by other terminologies referring to a group of bits, such as "frame," "message," "cell," or "datagram." Switch 112 receives the packet and determines the source client (i.e., the client to which virtual machine 132 belong) of the packet. Switch 112 can detect the source client based on membership to VLAN 1, an associated subnet and a corresponding IP address range, a source (physical or virtual) port, or any point of attachment between virtual machine 132 and switch 112. Switch 112 also detects the traffic flow type of the packet. Switch 112 can inspect headers of one or more layers (e.g., Ethernet and IP) to determine the traffic flow type. For example, if the packet includes a destination Transmission Control Protocol (TCP) port 80, the packet can be considered as part of a web traffic flow.

Based on the identified source client and the traffic flow type, switch 112 determines the requested service for the packet. Not all clients may require all services. For example, one client may require a web filtering service for all packets while another client may not require any web filtering service. If the packet from virtual machine 132 requires any service, switch 112 creates a service tag, which indicates the source client, the requested service for the packet, or both. Switch 112 then attaches the service tag with the packet and sends the packet to service switching gateway 116 via one or more hops through network 102. In some embodiments, switch 112 encapsulates the packet using a generic encapsulation mechanism and attaches the service tag as a part of the encapsulation. Examples of packet encapsulation include, but are not limited to, Generic Routing Encapsulation (GRE) tunneling, Internet Protocol Security (IPsec) tunneling, VLAN encapsulation, and IP encapsulation. Examples of corresponding service tag include, but are not limited to, a GRE key, Security Parameter Index (SPI), VLAN tag, and IP header options. If the packet does not require any service, switch 112 forwards the packet based on the destination information in the header of the packet.

Service switching gateway 116 terminates packet encapsulation from switch 112. Because the networking devices in network 102 forwards the packet based on the encapsulation, these devices do not need any modification to assist service switching. Upon receiving the packet and the service tag, service switching gateway 116 extracts the service tag and identifies the source client, the requested service, or both from the service tag. Suppose that service portal 152 can provide the requested service to the packet. Based on the identification, service switching gateway 116 selects service portal 152 for providing the service to the packet. Service switching gateway 116 then sends the packet to service portal 152 via one or more hops through network 104. In some embodiments, service switching gateway 116 encapsulates the packet based on a generic encapsulation mechanism supported by both service switching gateway 116 and service portal 152. After providing the service, service portal 152 can either forward the packet based on the destination information of the packet or send the packet back to service switching gateway 116. Upon receiving the packet back, service switching gateway 116 attaches the tag back to the packet and sends the packet back to switch 112.

Note that service switching gateway 116 can have packet encapsulation with switch 112 and service 152 using different encapsulation mechanisms. Service switching gateway 116 uses the service tag in the tunnel encapsulation to switch/steer the packet to corresponding service portal 152. FIG. 1B illustrates encapsulation-based dynamic service switching in conjunction with the example in FIG. 1A. In the example in FIG. 1B, during operation, switch 112 receives packets from virtual machines 142 and 144, which belong to different clients (denoted by different VLANs). Switch 112 establishes one or more forwarding encapsulation tunnels 160 with service switching gateway 116 for forwarding packets from virtual machines 142 and 144. An encapsulation tunnel encapsulates a packet between the origination and termination points of the tunnel.

In some embodiments, based on the customer requirements, service policies specify whether to use the same tunnel for multiple clients or use different tunnels for different clients. Consequently, switch 112 and service switching gateway 116 can have different tunnels for different clients based on the service policies. For example, switch 112 forwards packets from virtual machine 142 via tunnel 162 while forwards packets from virtual machine 144 via tunnel 164. Tunnel 162 and 164 can be based on different encapsulation mechanisms, wherein the service tag formats for tunnel 162 and 164 correspond to the respective encapsulation mechanism. For example, if tunnel 162 is an IPSec tunnel while tunnel 164 is a GRE tunnel, the service tags for all packets forwarded via tunnel 162 are IPSec SPIs and for all packets forwarded via tunnel 164 are GRE keys.

On the other hand, service switching gateway 116 establishes one or more service encapsulation tunnels 170 with service portals 152, 154, and 156 for forwarding packets based on their service requirements. In some embodiments, based on the encapsulation mechanisms supported by a respective service portal, service policies specify which encapsulation mechanism to use for establishing an encapsulation tunnel with a service portal. Service switching gateway 116 and service portals 152, 154, and 156 have tunnels 172, 174, and 176, respectively, between them. Tunnels 172, 174, and 176 can be based on different encapsulation mechanism. For example, tunnel 172 can be a GRE tunnel while tunnels 174 and 176 can be IPSec tunnels.

During operation, switch 112 receives a packet, which requires a service from service portal 152, from virtual machine 142. Switch 112 creates a service tag, which is an IPSec SPI, specifying the source client to which virtual machine 142 belongs. The service tag can also include a requested service, which is the service provided by service portal 152. Switch 112 then encapsulates the packet in IPSec tunneling format, includes the generated IPSec SPI in the encapsulation, and forwards the encapsulated packet to service switching gateway 116 via tunnel 162. Intermediate networking devices in network 102 forwards the packet based on the encapsulation. Upon receiving the encapsulated packet, service switching gateway 116 decapsulates the packet, extracts the IPSec SPI (i.e., the service tag), and identifies the source client and/or the requested service.

In some embodiments, service switching gateway 116 maintains a service mapping between the requested service and/or the source client, and the associated service portal 152. Based on the service mapping, identified the source client, and/or requested service, service switching gateway 116 determines service portal 152 as the service destination. Service switching gateway 116 then encapsulates the packet in GRE tunneling format and forwards the encapsulated packet to service portal 152 via tunnel 172. Upon receiving the encapsulated packet, service portal 152 decapsulates the packet and provides the requested service to the packet. In some embodiments, service switching gateway 116 specifies the requested service by regenerating the service tag as a GRE key and incorporates the GRE key in the packet encapsulation. Upon receiving the packet, service portal 152 extracts the service tag and identifies the requested service for the packet. This can be useful when service portal 152 can provide multiple services.

Figure 2:
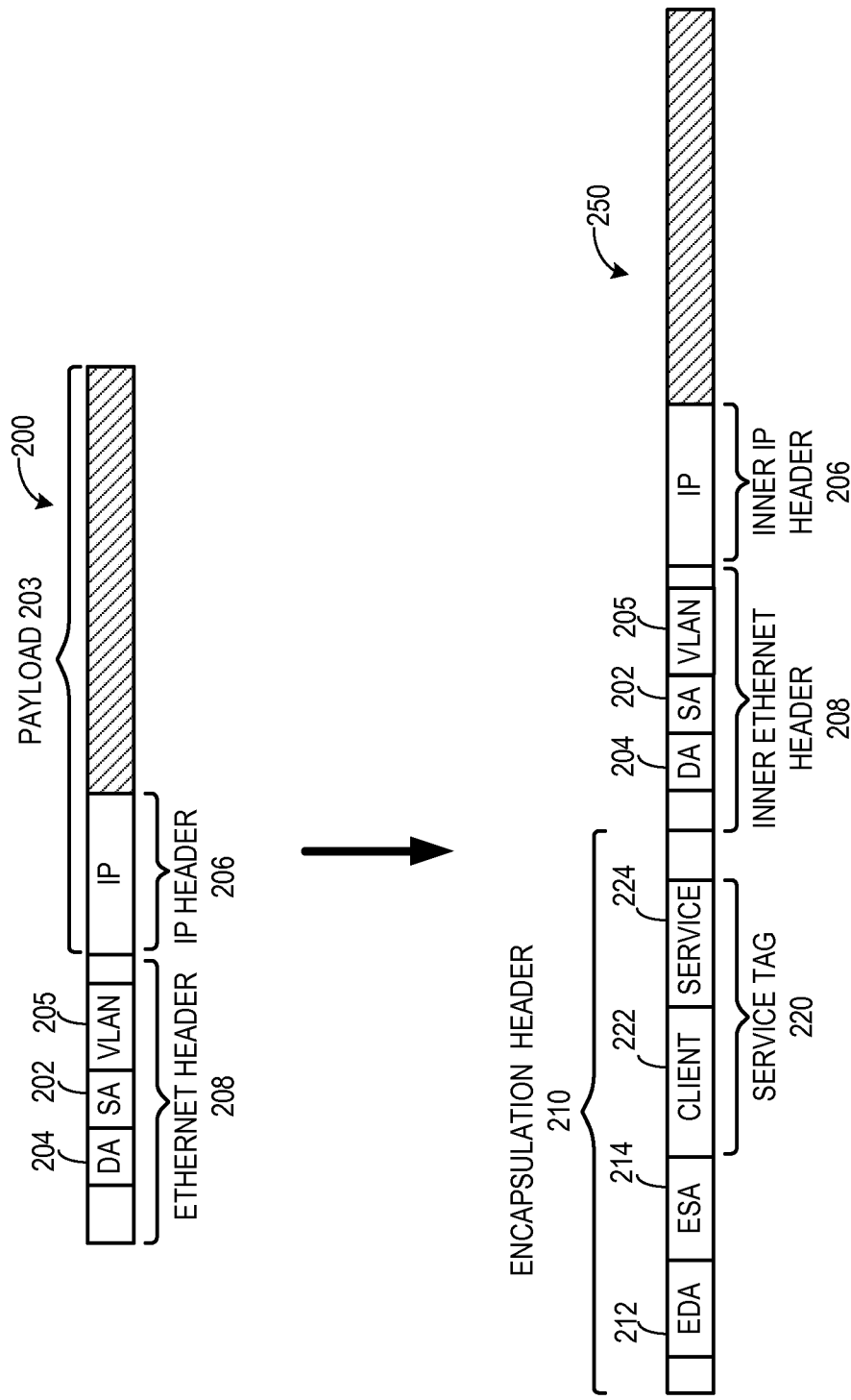
FIG. 2 illustrates header format for a conventional packet and its tunnel encapsulation of dynamic service switching.

FIG. 2 illustrates header format for a conventional packet and its tunnel encapsulation of dynamic service switching. In this example, a conventional Ethernet packet 200 typically includes a payload 203 and an Ethernet header 208. Typically, payload 203 can include an IP packet which includes an IP header 206. Ethernet header 208 includes a media access control (MAC) destination address (DA) 204, a MAC source address (SA) 202, and optionally a VLAN tag 205.

In one embodiment, switch 112 can encapsulate conventional packet 200 into an encapsulated packet 250. Encapsulated packet 250 typically includes an encapsulation header 210, which corresponds to the encapsulation mechanism. Encapsulation header 210 contains an encapsulation DA 212 and an encapsulation SA 214. The encapsulated packet is forwarded via network 102 based on encapsulation DA 212. Encapsulation header 210 also includes a service tag 220, which indicates the source client 222, a requested service 224 for packet 200, or both. For example, if encapsulation header 210 corresponds to an IPSec tunnel, a GRE tunnel, or a VLAN encapsulation, service tag 220 is an IPSec SPI, a GRE key, or a VLAN tag, respectively.

Take, for example, packet 200 is a web request to a web server generated by virtual machine 142. Typically, an upper layer application in virtual machine 142 generates an IP packet destined for the web server, using web server's IP address. This IP packet becomes payload 203, and the web server's IP address becomes the destination IP address in IP header 206. In addition, virtualization software 140's IP address becomes the source IP address in IP header 206. The layer-2 in virtual machine 142 then generates Ethernet header 208 to encapsulate payload 203. MAC DA 204 of Ethernet header 208 is assigned the default gateway router's MAC address. For example, if switch 112 is the gateway router, MAC DA 204 of Ethernet header 208 is switch 112's MAC address. MAC SA 202 of Ethernet header 208 is virtual machine 142's MAC address. Virtual machine 142 then sends Ethernet packet 200 to switch 112.

When switch 112 receives Ethernet packet 200 from virtual machine 142, switch 112 inspects the Ethernet MAC DA 204, MAC SA 202, VLAN tag 205, and optionally IP header 206 and its payload (e.g., the layer-4 header). Based on this information, switch 112 determines that Ethernet packet 200 is associated with web service and requires a service from service portal 152. Subsequently, switch 112 assembles the encapsulation header 210, attaches service tag 220 (corresponding to an encapsulation mechanism), and forwards packet 220 to service switching gateway 116. Upon receiving packet 220, service switching gateway 116 removes encapsulation header 210 and extracts service tag 220. Service switching gateway 116 then assembles another encapsulation header for the packet and forwards the encapsulated packet to service portal 152.

Figure 3:
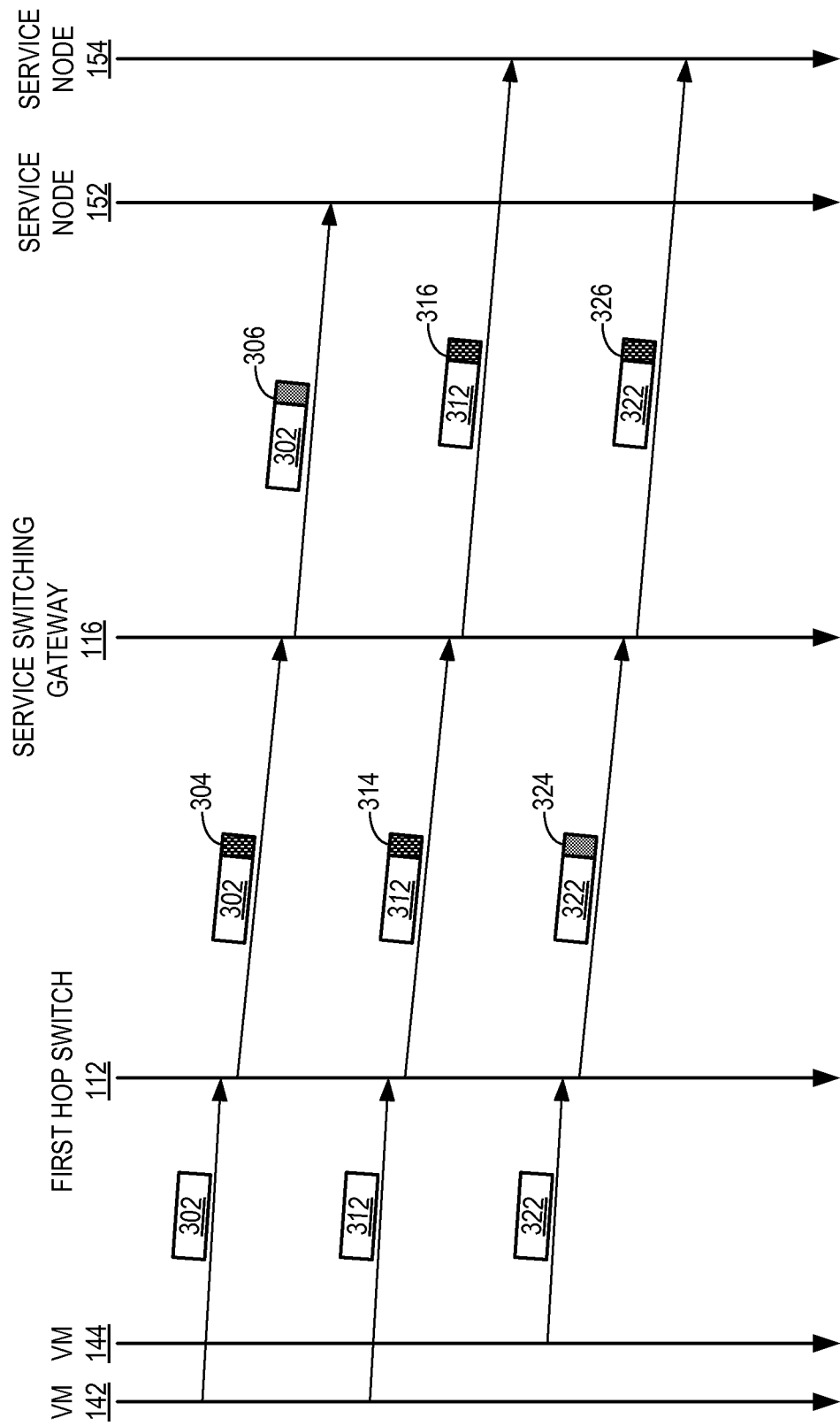
FIG. 3 presents a time-space diagram illustrating an exemplary dynamic service switching process in a datacenter environment.

As mentioned above, when virtual machine 142 sends a packet to the web server, the packet is switched to a service portal. FIG. 3 presents a time-space diagram illustrating an exemplary dynamic service switching process in a datacenter environment. During operation, switch 112 receives packet 302, which requires a service from service portal 152, from virtual machine 142. Switch 112 creates a service tag specifying the source client to which virtual machine 142 belongs and a requested service, which is the service provided by service portal 152. Switch 112 then encapsulates packet 302 in encapsulation header 304, includes the generated service tag in encapsulation header 304, and forwards encapsulated packet 302 to service switching gateway 116. Upon receiving encapsulated packet 302, service switching gateway 116 decapsulates packet 302, extracts the service tag from encapsulation header 304, and identifies the source client and/or the requested service. Based on the identified the source client and/or the requested service, service switching gateway 116 determines service portal 152 as the service destination. Service switching gateway 116 then encapsulates packet 302 in another encapsulation header 306 and forwards encapsulated packet 302 to service portal 152. Note that encapsulation headers 304 and 306 can be based on different encapsulation mechanism.

Switch 112 can receive another packet 312, which requires a service from service portal 154, from virtual machine 142. Switch 112 encapsulates packet 312 in encapsulation header 314, includes a corresponding service tag in encapsulation header 314, and forwards encapsulated packet 312 to service switching gateway 116. However, based on the service policies associated with a client, switch 112 can use a different encapsulation mechanism for that client. In this example, when switch 112 receives packet 322, which requires a service from service portal 154, from virtual machine 144 belonging to a different client, switch 112 encapsulates packet 322 in encapsulation header 324, which is based on a different encapsulation mechanism than encapsulation headers 304 and 314. Switch 112 then includes a corresponding service tag in encapsulation header 324, and forwards encapsulated packet 322 to service switching gateway 116.

Upon receiving encapsulated packets 312 and 322, service switching gateway 116 decapsulates packets 312 and 322, extracts the service tag from encapsulation headers 314 and 324, respectively, and identifies the source client and/or the requested service. Based on the identified the source client and/or the requested service and a service mapping, service switching gateway 116 determines service portal 154 as the service destination. Service switching gateway 116 then encapsulates packets 312 and 322 in encapsulation headers 316 and 326, respectively, and forwards encapsulated packets 312 and 322 to service portal 154. Encapsulation headers 304 and 306 can be based on the same encapsulation mechanism even though they are generated at different locations.

Figure 4A:
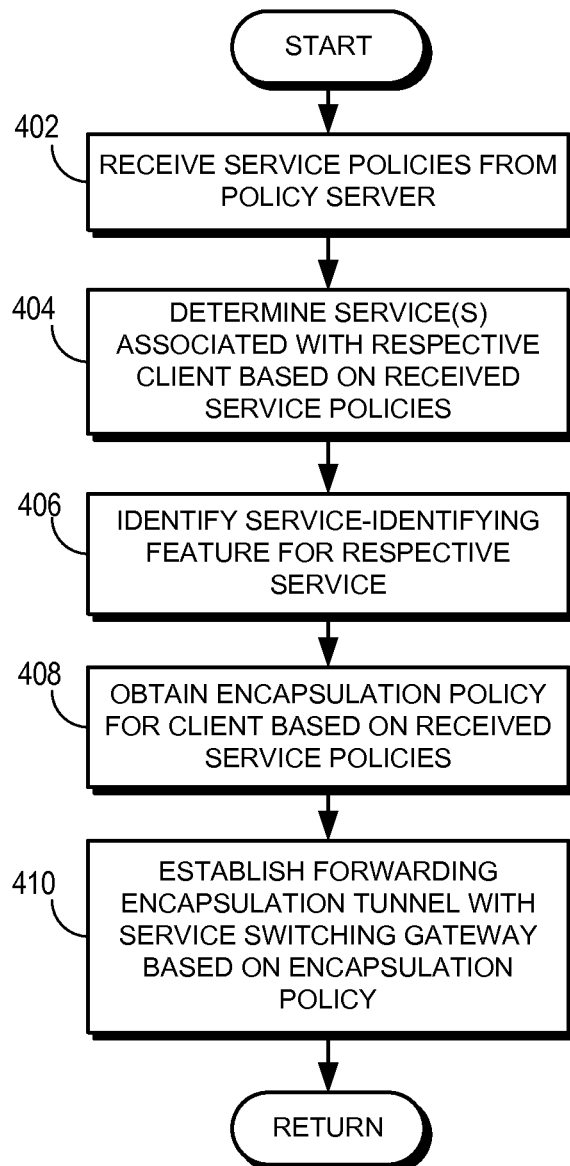
FIG. 4A presents a flow chart illustrating an exemplary process of an origination switch configuring forwarding policies in a datacenter environment based on service requirements.

FIG. 4A presents a flow chart illustrating an exemplary process of an origination switch configuring forwarding policies in a datacenter environment based on service requirements. During operation, the switch receives service policies from a policy server (operation 402), as described in conjunction with FIG. 1A. The switch then determines the service(s) associated with a respective client based on the received service policies (operation 404). The switch also identifies service-identifying features of a respective service (operation 406). For example, service-identifying feature of web filtering can be determining whether a packet includes a destination TCP port 80. The switch obtains encapsulation policy for a respective client based on the received service policies (operation 408). An encapsulation policy dictates the supported encapsulation mechanisms, and which mechanism should be used under which circumstance. For example, a client may require a separate tunnel for forwarding its packets, as described in conjunction with FIG. 1B. The switch then establishes a forwarding encapsulation tunnel with a service switching gateway based on the encapsulation policy (operation 410).

Figure 4B:
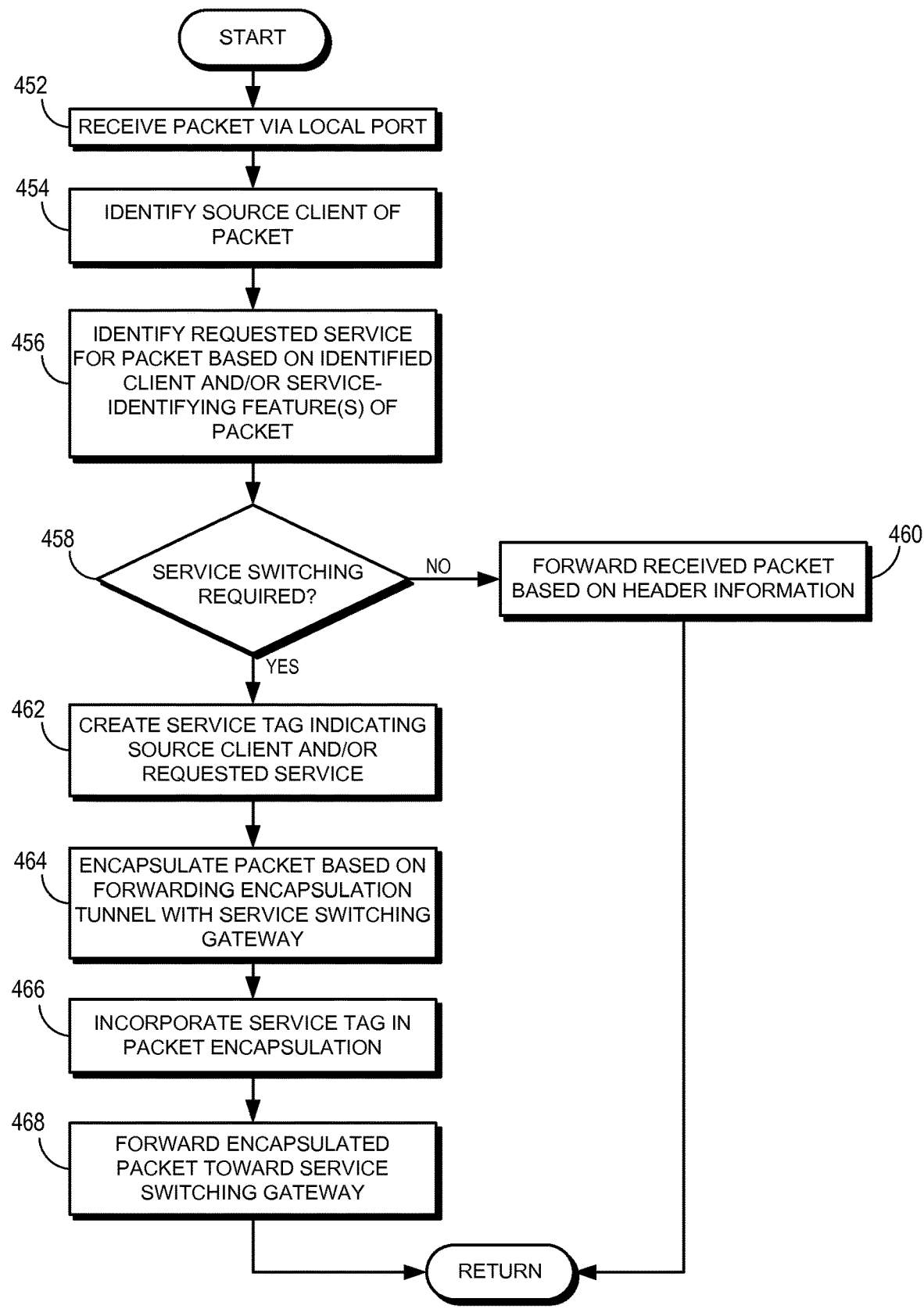
FIG. 4B presents a flow chart illustrating an exemplary process of an origination switch forwarding a packet in a datacenter environment.

FIG. 4B presents a flow chart illustrating an exemplary process of an origination switch forwarding a packet in a datacenter environment. Upon receiving a packet via a local port (operation 452), the switch identifies the source client of the packet (operation 454). In some embodiments, the switch detects the source client based on membership to a VLAN, an associated subnet and a corresponding IP address range, a source (physical or virtual) port, or any point of attachment with the client. The switch then identifies the service requested for the packet based on the identified client and service-identifying feature(s) of the packet (operation 456). The switch then checks whether the packet requires service switching based on the service policies, as described in conjunction with FIG. 4A (operation 458).

If the packet requires service switching, the switch creates a service tag indicating the source client and/or the requested service for the packet (operation 462). The switch encapsulates the packet based on the forwarding tunnel with a service switching gateway (operation 464). Note that this forwarding tunnel can be client-specific. The switch incorporates the service tag in the packet encapsulation (operation 466) and forwards the encapsulated packet toward the service switching gateway (operation 468). If the packet does not require service switching, the switch forwards the packet based on its header information (operation 460).

Figure 5A:
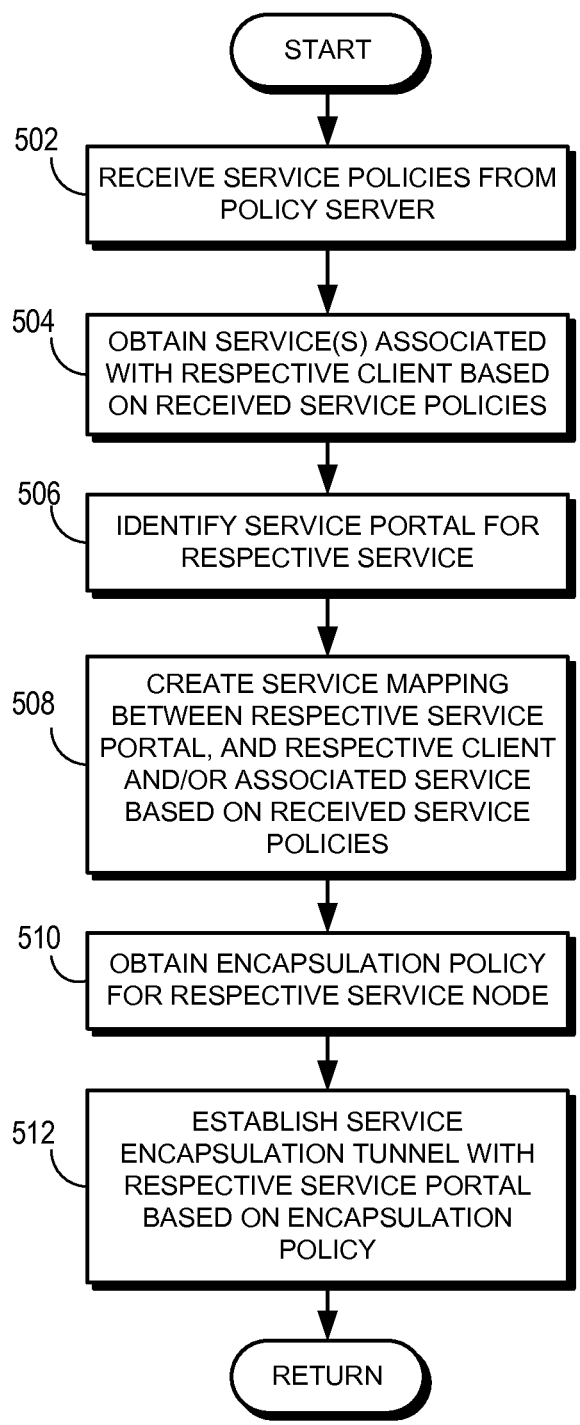
FIG. 5A presents a flow chart illustrating an exemplary process of a service switching gateway configuring service switching policies in a datacenter environment.

FIG. 5A presents a flow chart illustrating an exemplary process of a service switching gateway configuring service switching policies in a datacenter environment. During operation, the service switching gateway receives service policies from a policy server (operation 502), as described in conjunction with FIG. 1A. The service switching gateway then determines the service(s) associated with a respective client based on the received service policies (operation 504). The service switching gateway identifies service portal for a respective service (operation 506) and creates a service mapping between a respective service portal and a respective client and/or associated service based on the received service policies (operation 508). The service switching gateway obtains encapsulation policy for a respective service portal (operation 510) and establishes a service encapsulation tunnel with a respective service portal based on the encapsulation policy (operation 512).

Figure 5B:
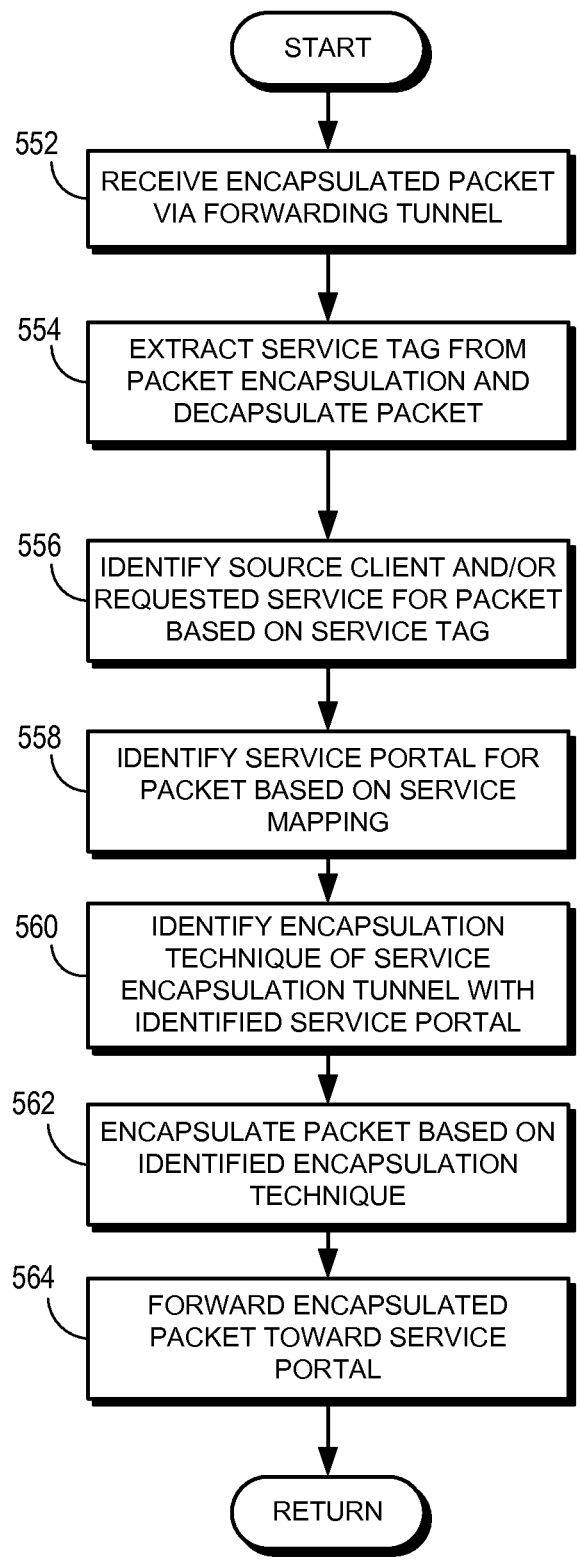
FIG. 5B presents a flow chart illustrating an exemplary process of a service switching gateway forwarding a packet in a datacenter environment based on service requirements.

FIG. 5B presents a flow chart illustrating an exemplary process of a service switching gateway forwarding a packet in a datacenter environment based on service requirements. Upon receiving a packet via a forwarding tunnel (operation 552), the service switching gateway extracts the service tag from the packet encapsulation and decapsulate the packet (operation 554) and identifies the source client and/or a requested service associated with the packet based on the service tag (operation 556). The service switching gateway identifies the service portal for the packet based on the service mapping in the service switching gateway (operation 558) and the encapsulation mechanism of service encapsulation tunnel with the identified service portal (operation 560). Note that this service encapsulation tunnel can be service-specific. The switch encapsulates the packet based on the identified encapsulation mechanism (operation 562) and forwards the encapsulated packet toward the identified service portal (operation 564).

Figure 6:
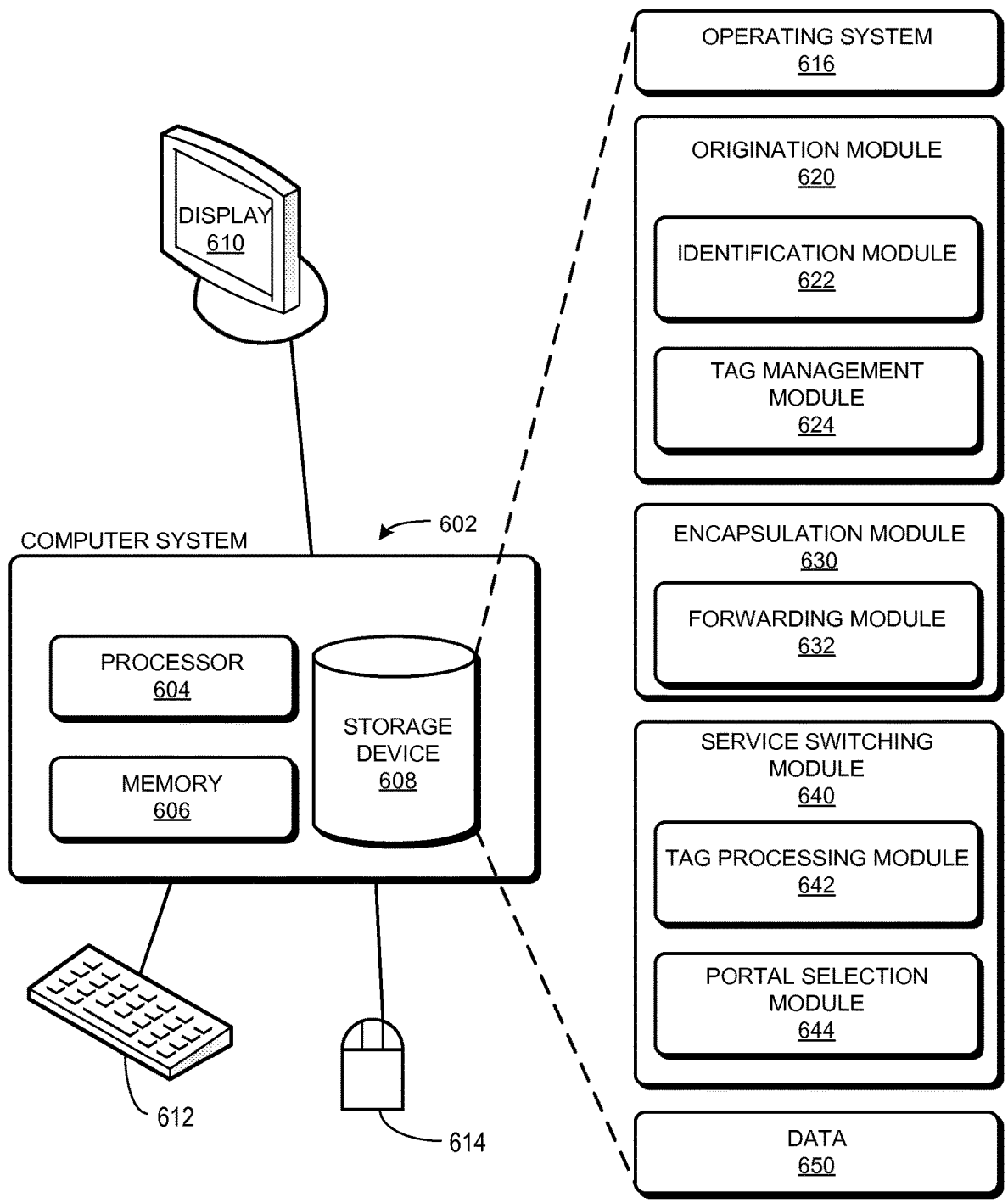
FIG. 6 illustrates an exemplary service switching gateway.

It should be noted that the service switching gateway described herein can be implemented as a stand-alone appliance, as part of a switch or router, or as part of a host machine. Furthermore, the service switching gateway can be implemented in hardware or software, or a combination of both. FIG. 6 illustrates an exemplary service switching gateway. In this example, a computer system 602 includes a processor 604, memory 606, and a storage device 608. Computer system 602 is also coupled to a display 610, a keyboard 612, and a pointing device 614. Storage device 608 stores data 650 and instructions which when loaded into memory 606 and executed by processor 604 implement an operating system 616, an origination module 620, an encapsulation module 630, and an service switching module 640. Origination module 620 includes an identification module 622 and a tag management module 624. Encapsulation module 630 includes a forwarding module 632. Service switching module 640 includes a tag processing module 642 and a portal selection module 644. When executed by the processor, these modules jointly or separately perform the functions described above.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory machine readable medium storing a program for specifying a service to perform on a received packet, the program for execution by at least one hardware processing unit, the program comprising sets of instructions for:

identifying a source client and a requested service associated with the received packet;

generating a service tag that identifies the source client and the requested service;

storing the service tag in an encapsulation header and using the encapsulation header with the stored service tag to encapsulate the packet; and forwarding the encapsulated packet to a service switching gateway that extracts the service tag from the encapsulation header and directs the packet to a service machine based on the service tag, wherein as the service tag identifies both the source client and the requested service, the service switching gateway identifies the service machine based on the source client and the requested service associated with the packet.

2. The non-transitory machine readable medium of claim 1, wherein the packet originates from a virtual machine executing on a host computer, and program is executed by a device that is different than the host computer.

3. The non-transitory machine readable medium of claim 1, wherein the packet originates from a virtual machine executing on a host computer, and the program executes on the host computer.

4. The non-transitory machine readable medium of claim 1, wherein the packet is sent by a machine operating in a multi-tenant datacenter, and the identified source client is a tenant.

5. The non-transitory machine readable medium of claim 1, wherein the service tag comprises one or more of: a GRE key, an IPSec Security Parameter Index (SPI), a VLAN tag, and IP header options.

6. A non-transitory machine readable medium storing a service-switching program for directing an encapsulated first packet to a service machine to perform a service on the first packet, the program for execution by at least one hardware processing unit, the program comprising sets of instructions for:

receiving the encapsulated first packet comprising an encapsulation header that includes a service tag that identifies (i) a source identifier identifying a source machine for the first packet and (ii) a service identifier identifying the requested service;

extracting, from the encapsulated first packet, the service tag;

from a plurality of service policies, selecting a particular service policy based on the extracted service tag;

using the selected service policy to select a particular service machine to perform a service operation on the first packet;

forwarding the first packet to the selected particular service machine;

receiving a second packet from the particular service machine to which the first packet was forwarded; and reconstructing the service identifier and the source identifier for the second packet based on the selected service policy.

7. The non-transitory machine readable medium of claim 6, wherein the service tag comprises one or more of: a GRE key, an IPSec Security Parameter Index (SPI), a VLAN tag, and IP header options.

8. The non-transitory machine readable medium of claim 6, wherein the first packet originates from a machine that executes on a host computer and the first packet is encapsulated by a service originating switch executing on the host computer.

9. The non-transitory machine readable medium of claim 6, wherein the first packet originates from a machine that executes on a host computer and the first packet is encapsulated by a service originating switch operating outside of the host computer.

10. A method for specifying a service to perform on a received packet, the method comprising:

identifying a source client and a requested service associated with the received packet;

generating a service tag that identifies the source client and the requested service;

storing the service tag in an encapsulation header, and using the encapsulation header with the stored service tag to encapsulate the packet; and forwarding the encapsulated packet to a service switching gateway, that extracts the service tag from the encapsulation header and directs the packet to a service machine based on the service tag, wherein as the service tag identifies both the source client and the requested service, the service switching gateway identifies the service machine based on the source client and the requested service associated with the packet.

11. The method of claim 10, wherein the packet originates from a virtual machine executing on a host computer, and program is executed by a device that is different than the host computer.

12. The method of claim 10, wherein the packet originates from a virtual machine executing on a host computer, and the program executes on the host computer.

13. The method of claim 10, wherein the packet is sent by a machine operating in a multi-tenant datacenter, and the identified source client is a tenant.

14. The method of claim 10, wherein the service tag comprises one or more of: a GRE key, an IPSec Security Parameter Index (SPI), a VLAN tag, and IP header options.

* * * * *